Dec. 24, 1935.  A. S. MITCHELL  2,025,355
UPHOLSTERY MAKING APPARATUS
Filed Nov. 2, 1931   17 Sheets-Sheet 2
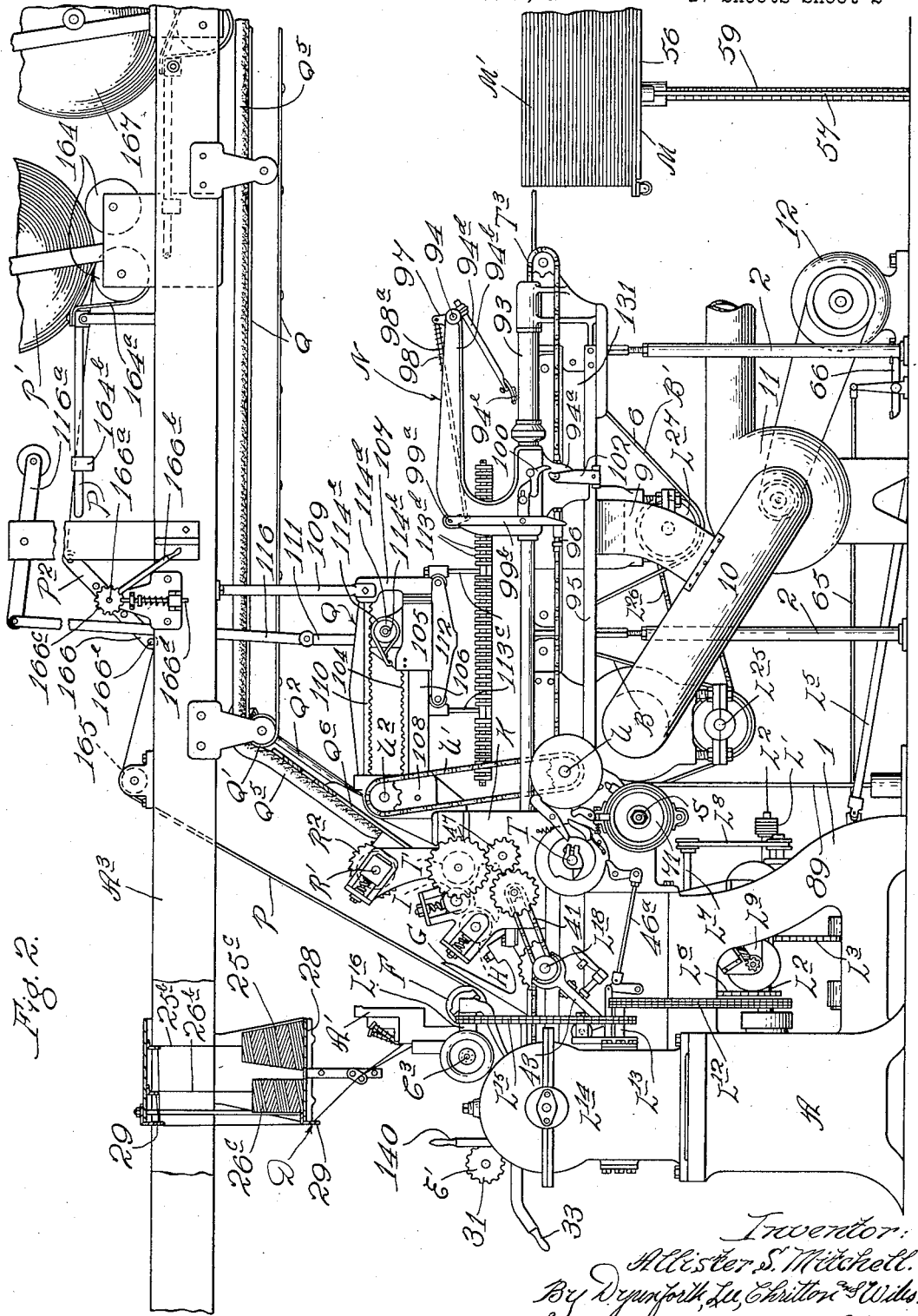

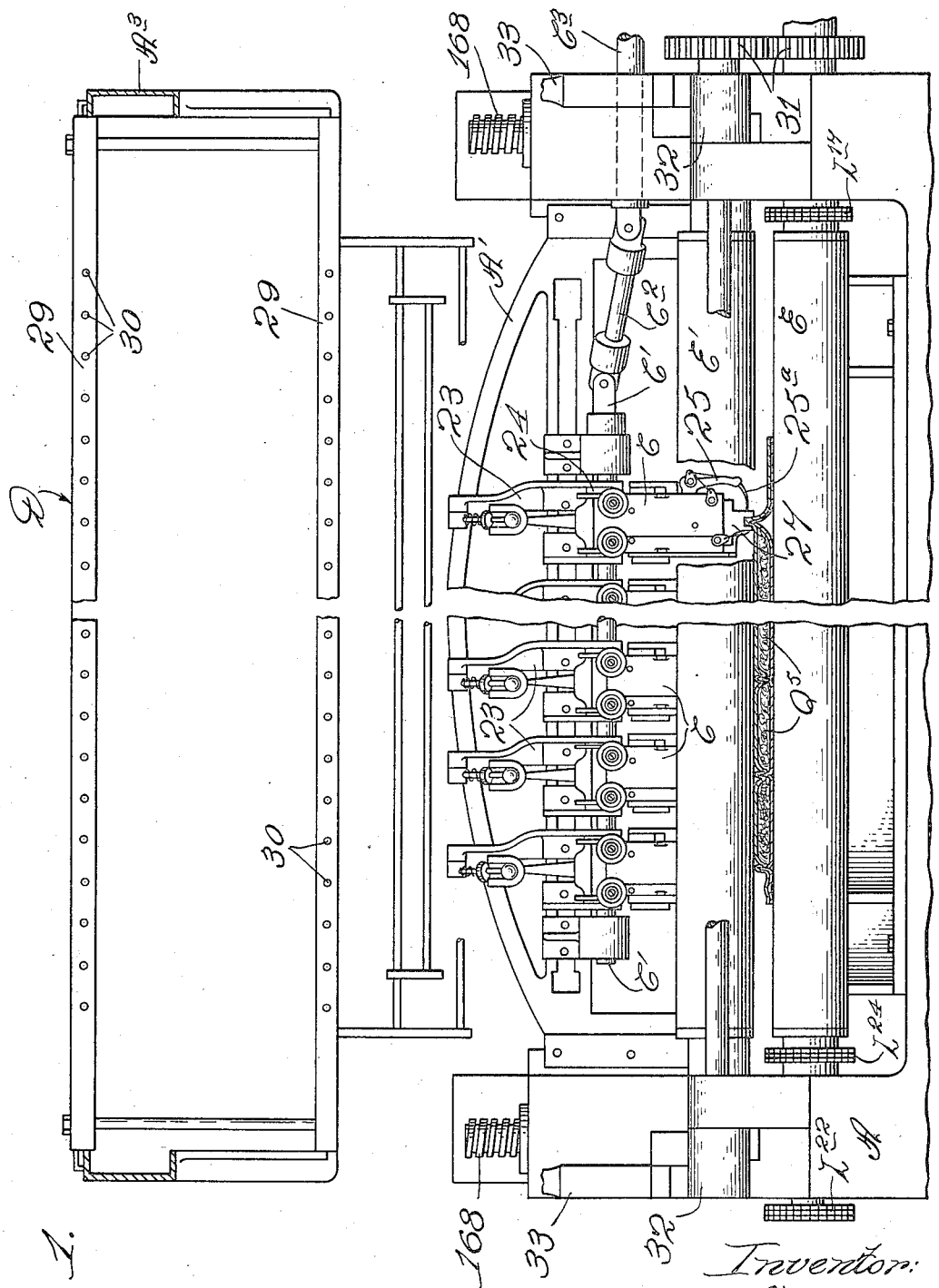

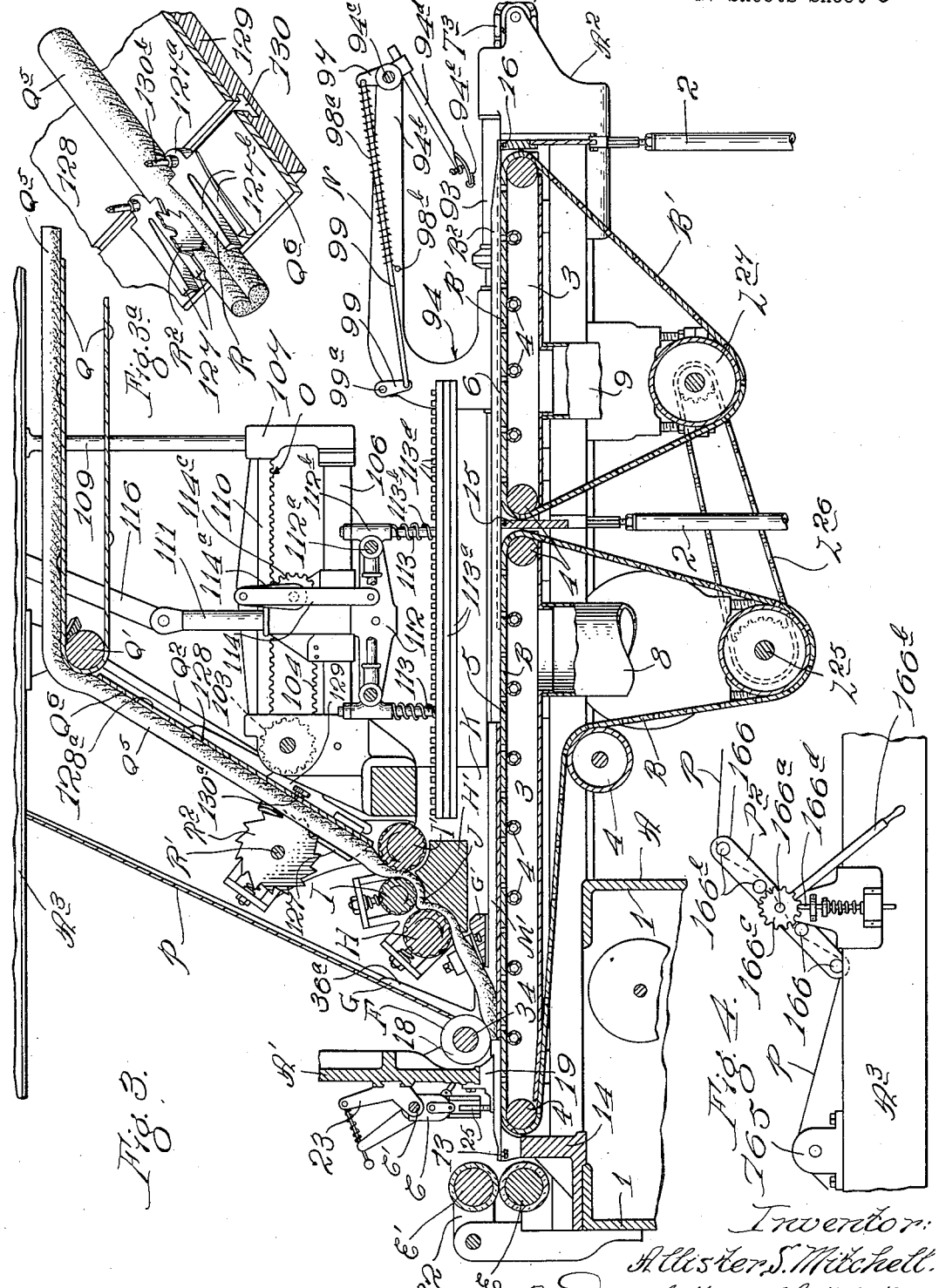

Dec. 24, 1935.  A. S. MITCHELL  2,025,355
UPHOLSTERY MAKING APPARATUS
Filed Nov. 2, 1931    17 Sheets-Sheet 4
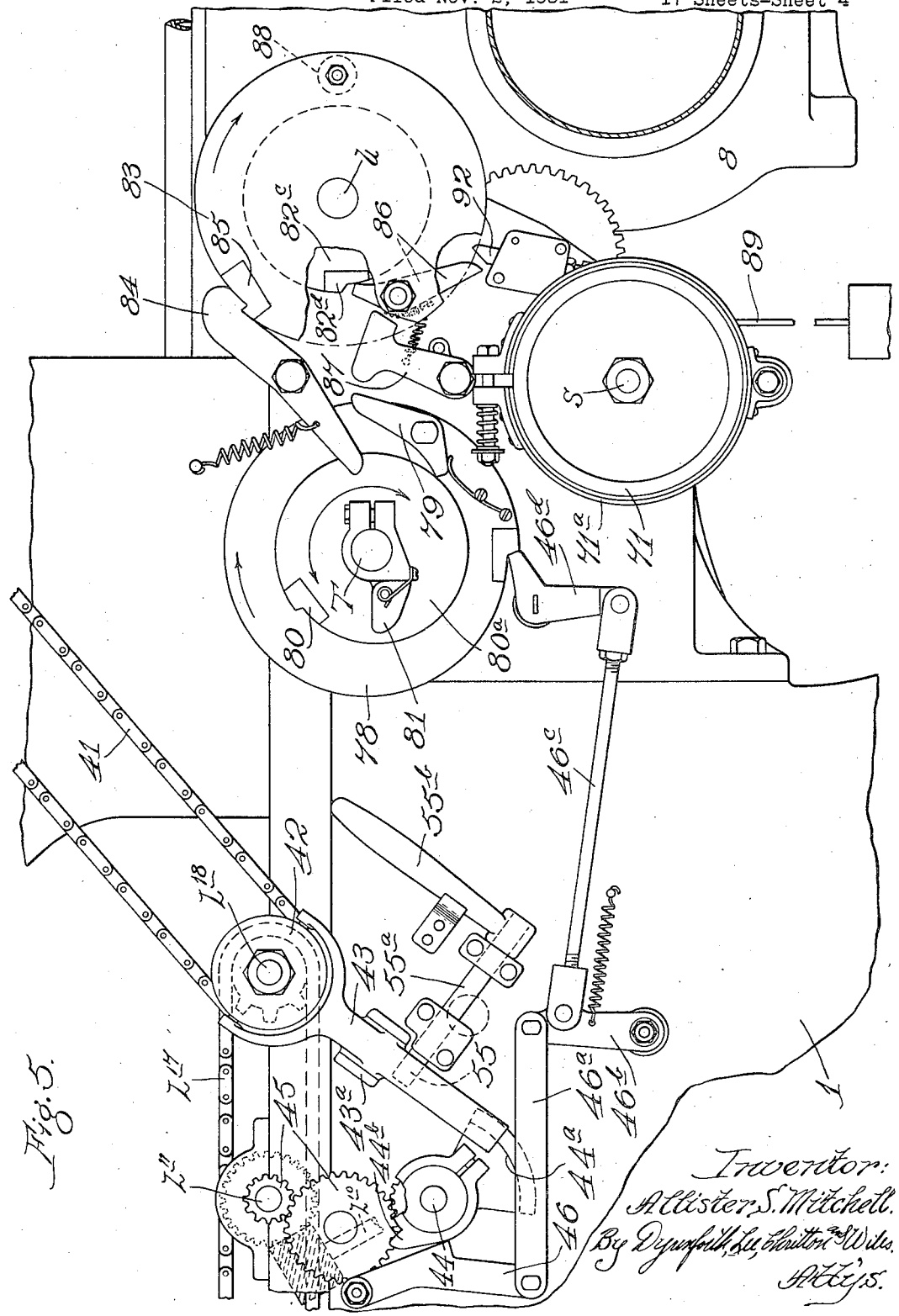

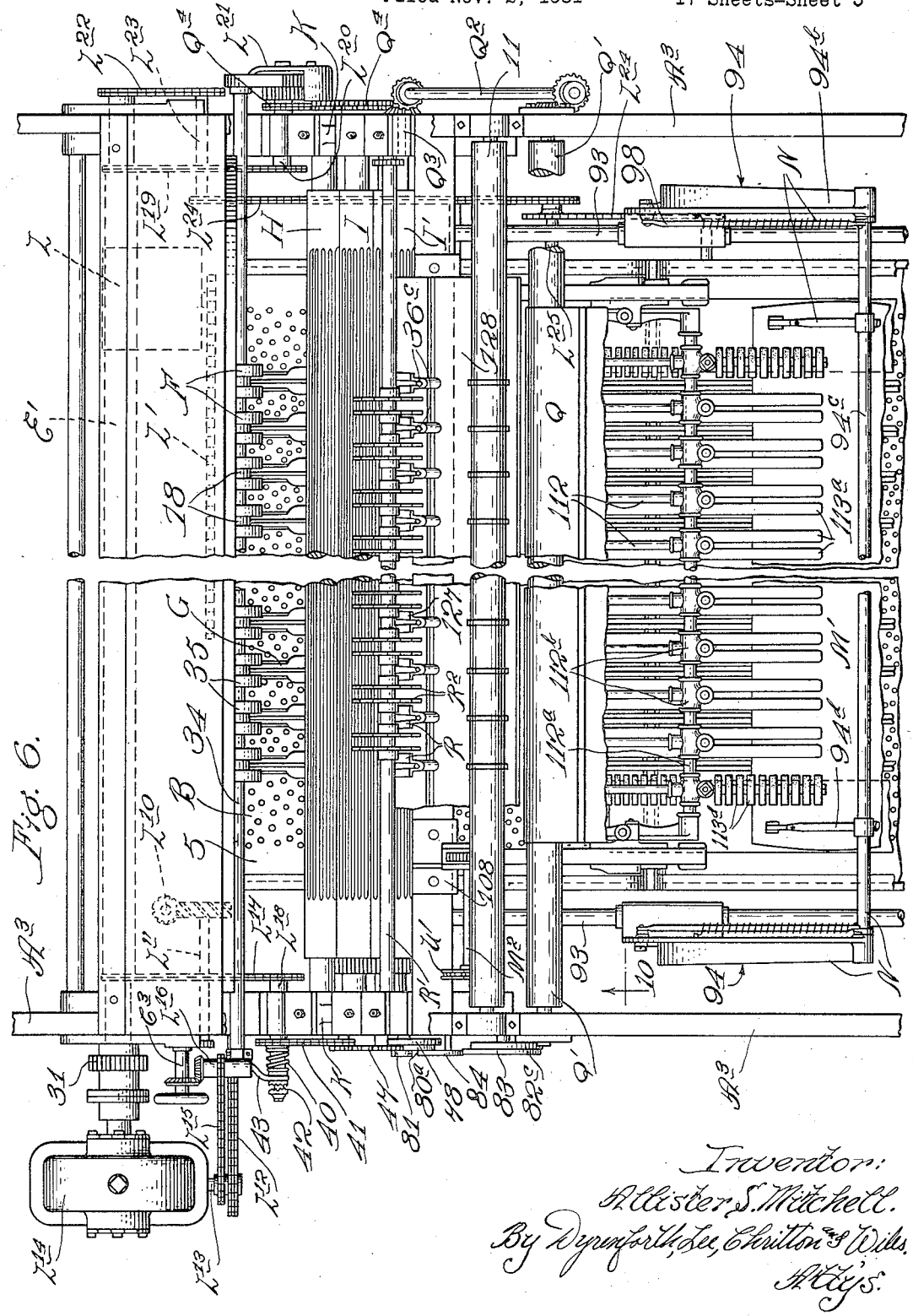

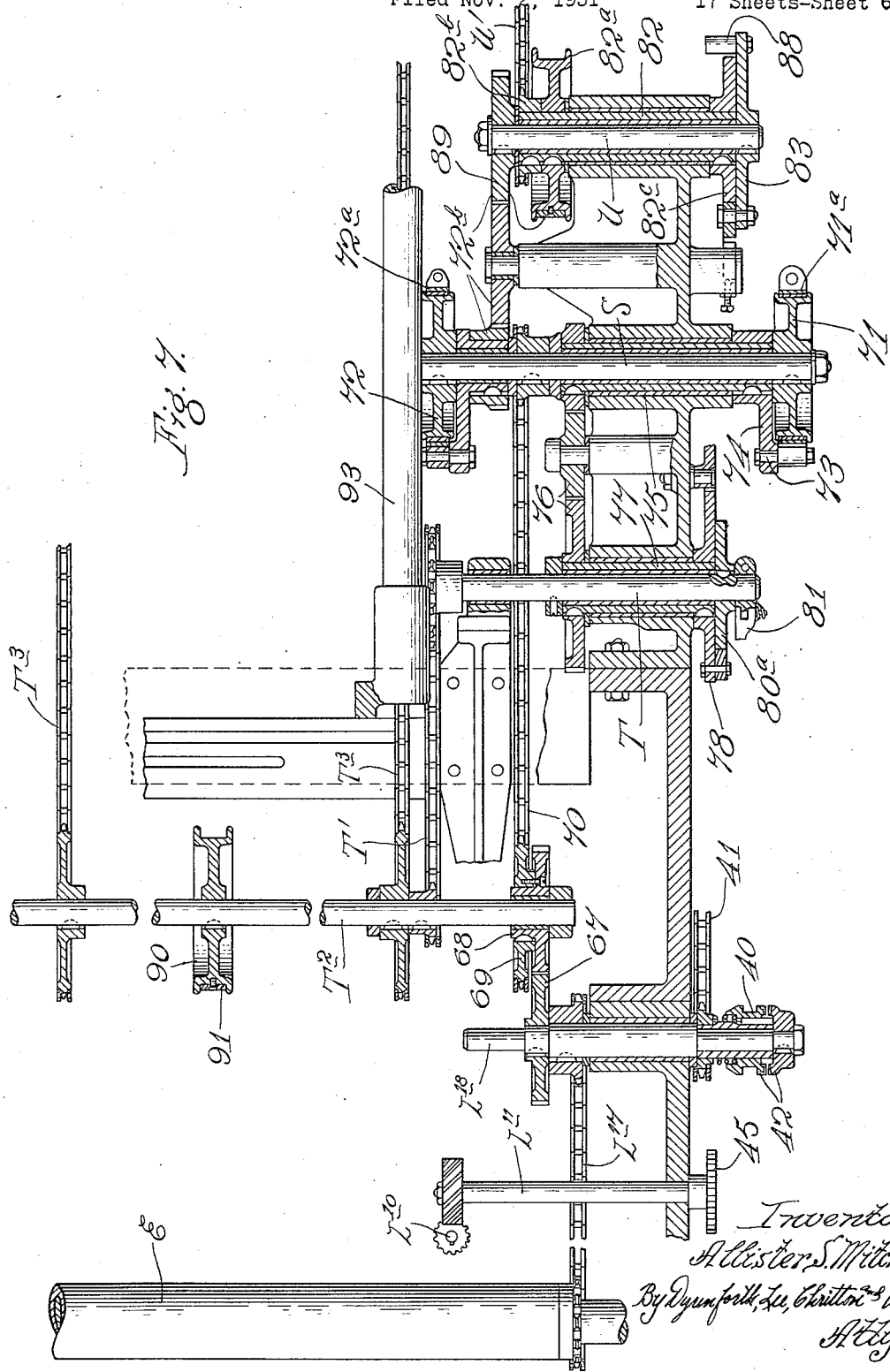

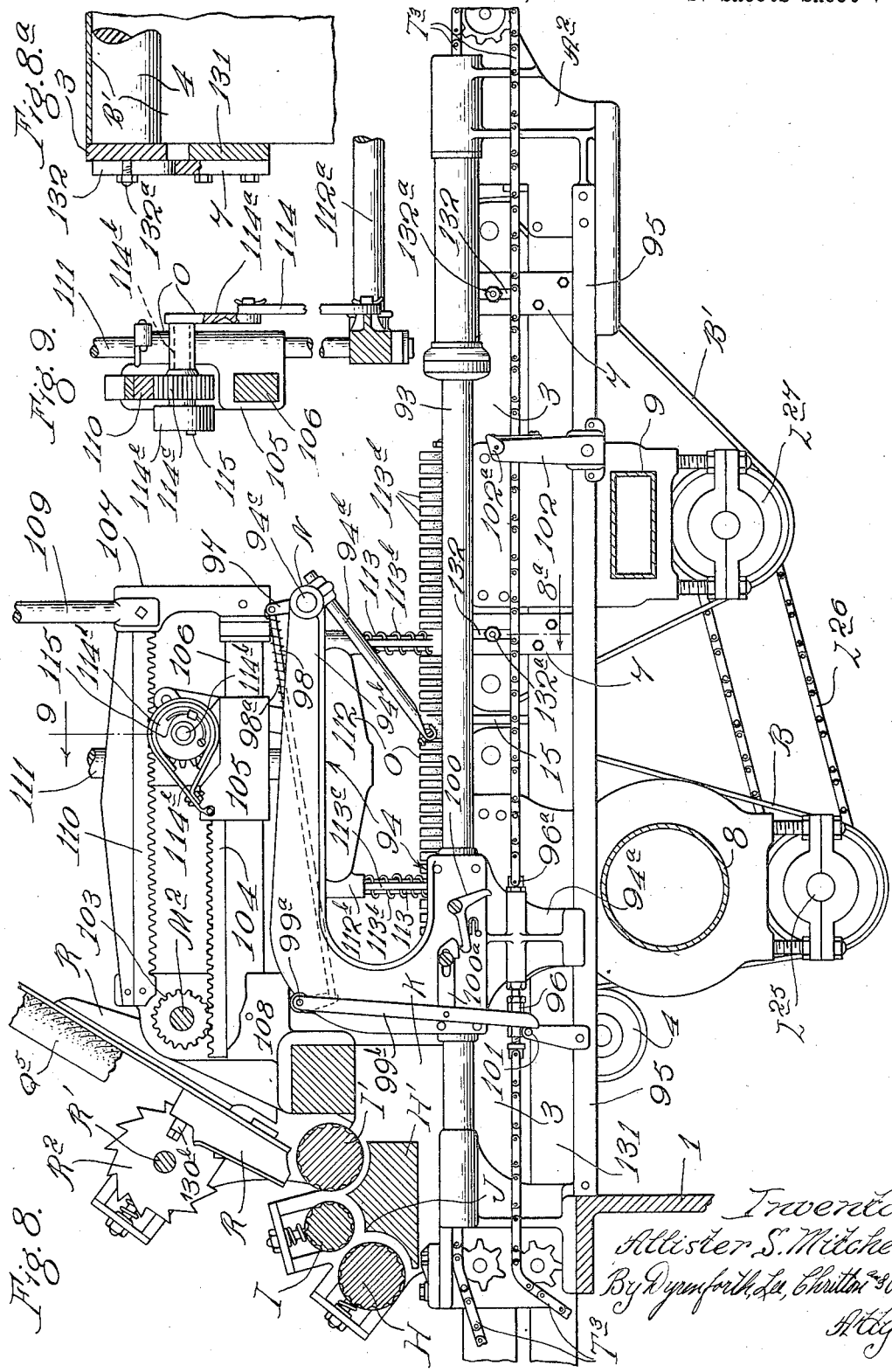

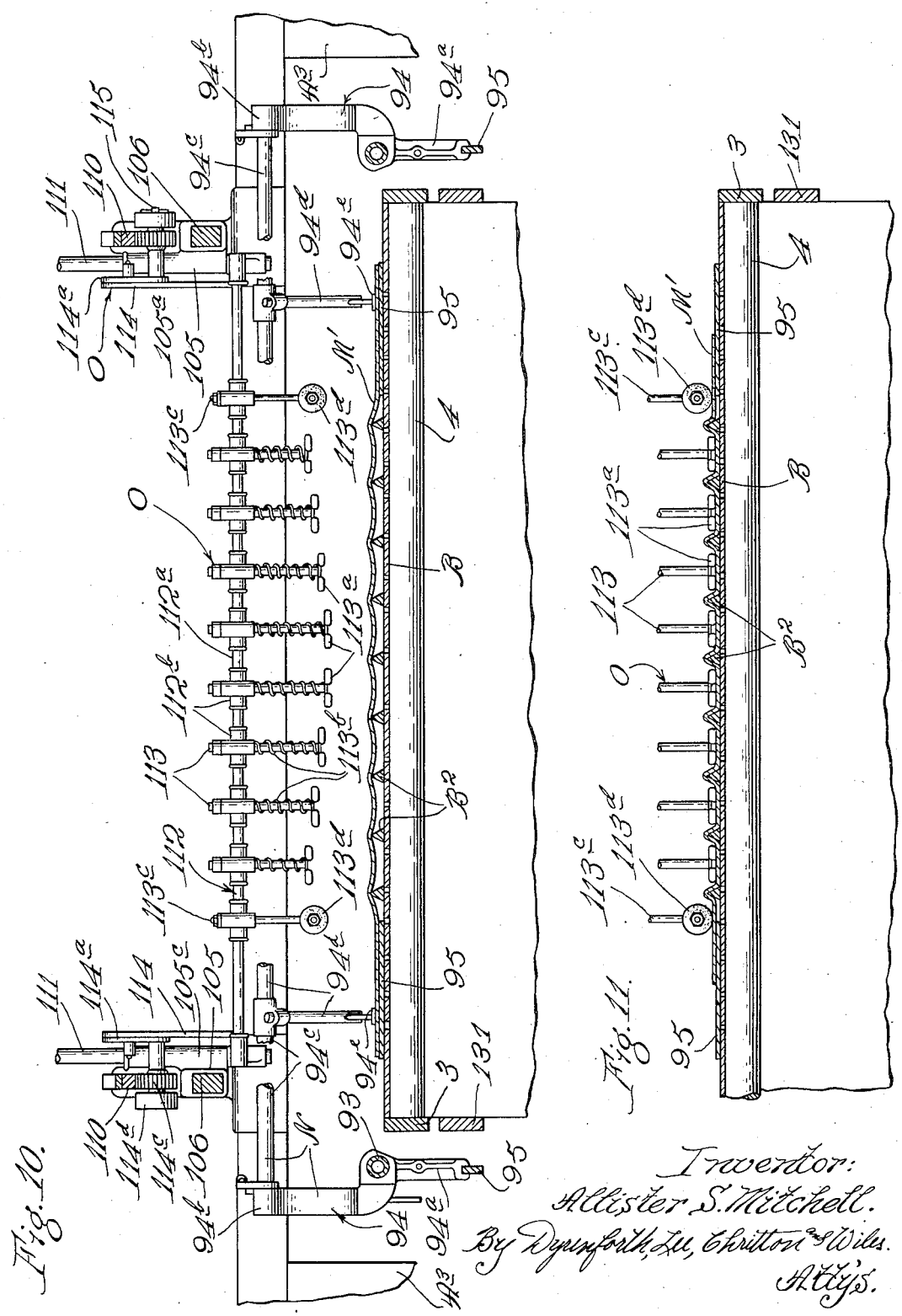

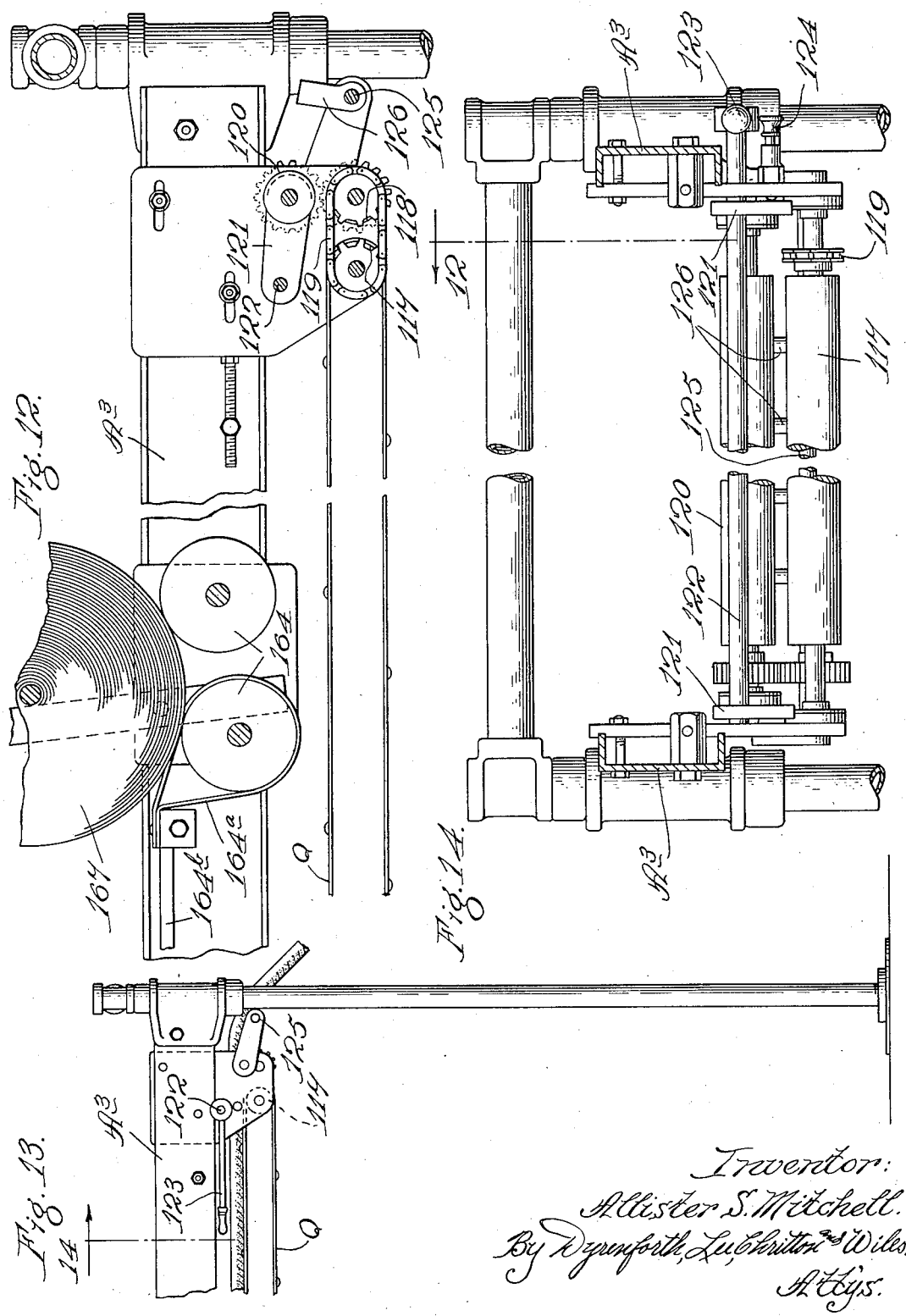

Dec. 24, 1935.　　　　A. S. MITCHELL　　　　2,025,355
UPHOLSTERY MAKING APPARATUS
Filed Nov. 2, 1931　　　17 Sheets-Sheet 10
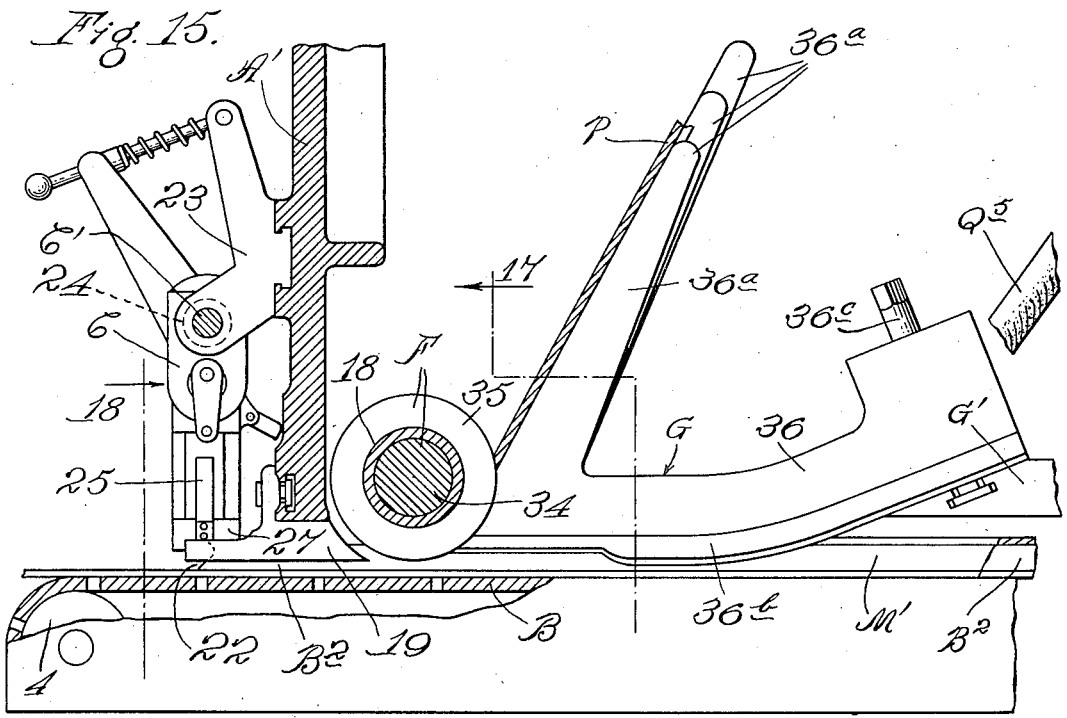
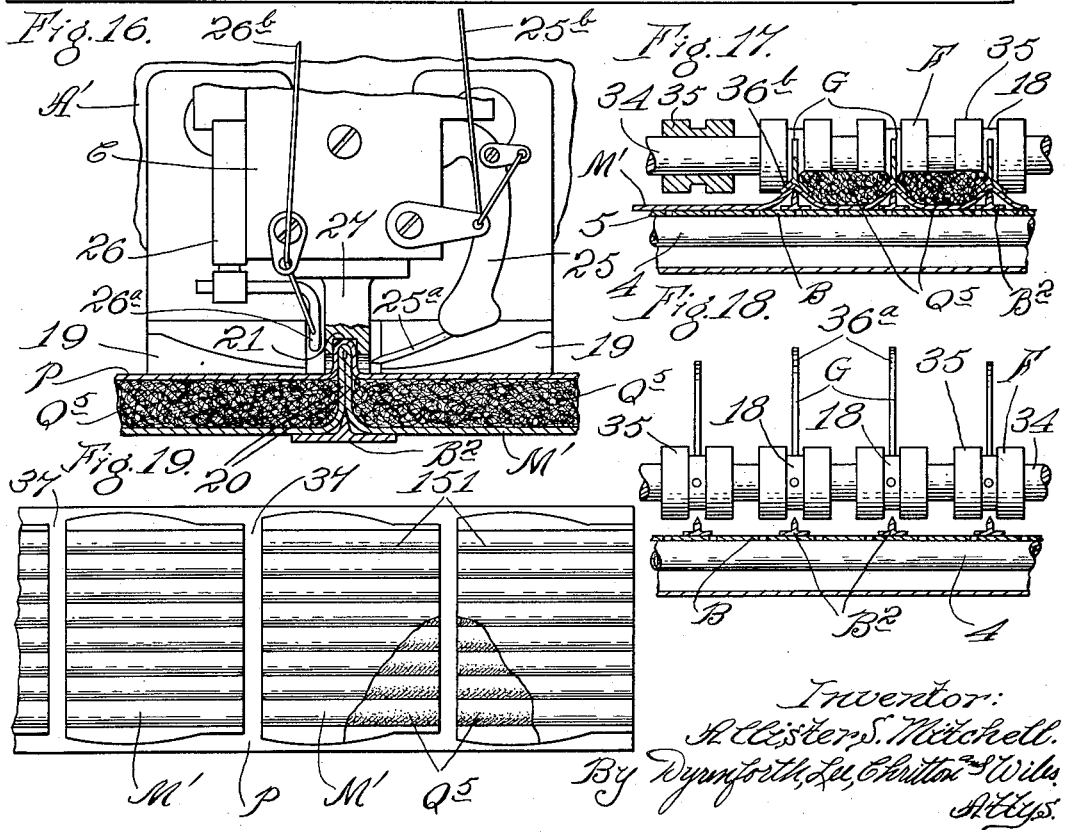

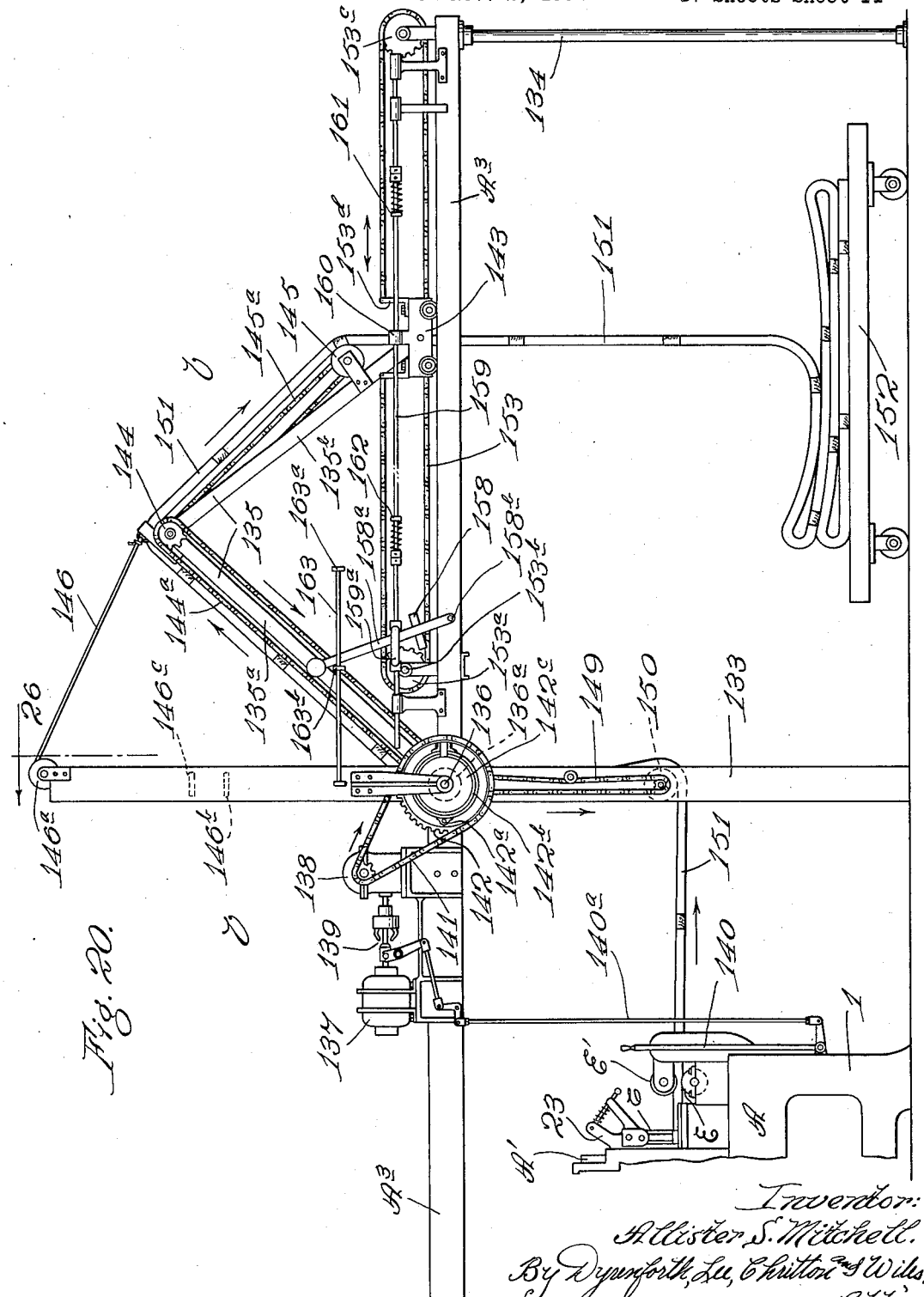

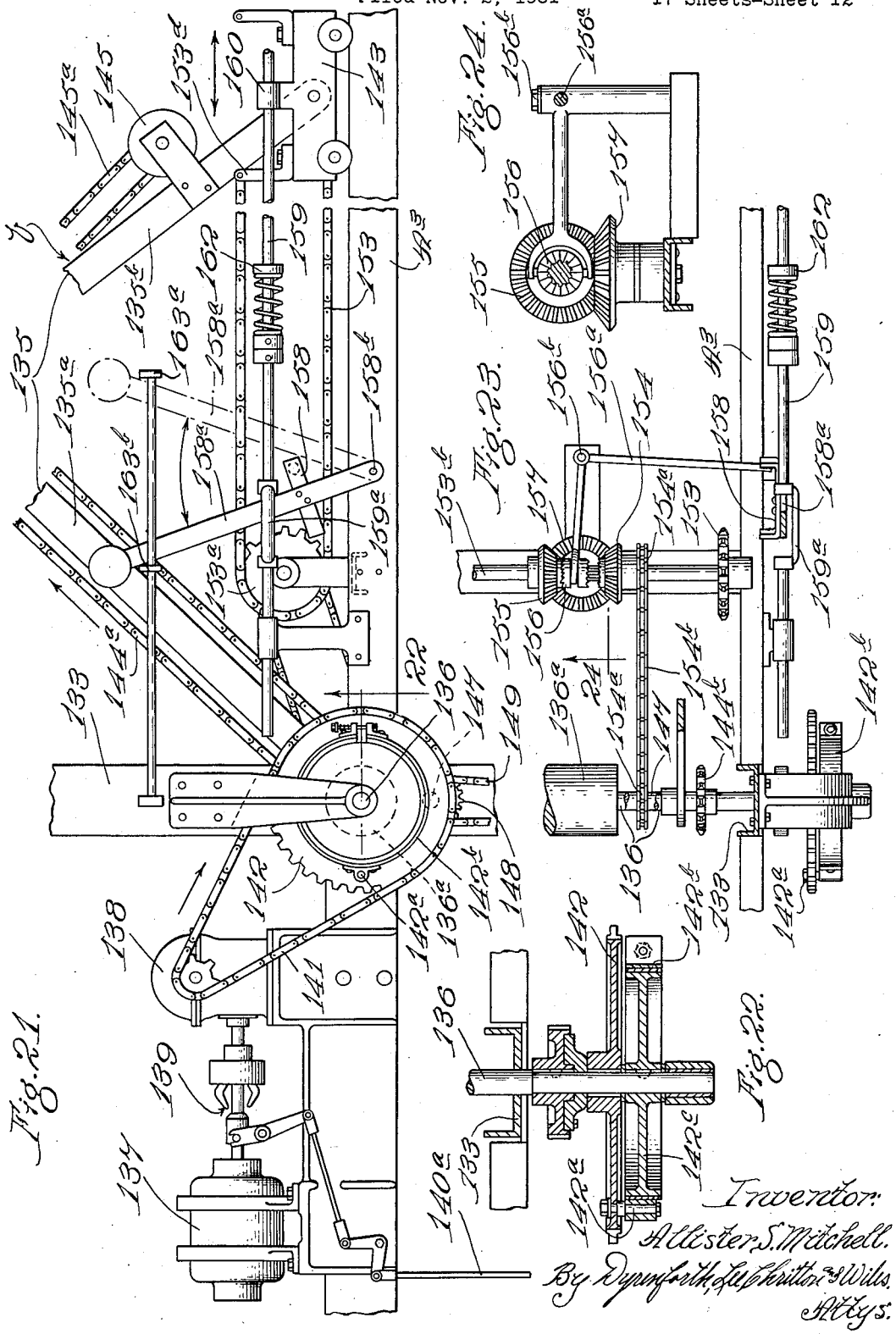

Dec. 24, 1935.  A. S. MITCHELL  2,025,355
UPHOLSTERY MAKING APPARATUS
Filed Nov. 2, 1931  17 Sheets-Sheet 13
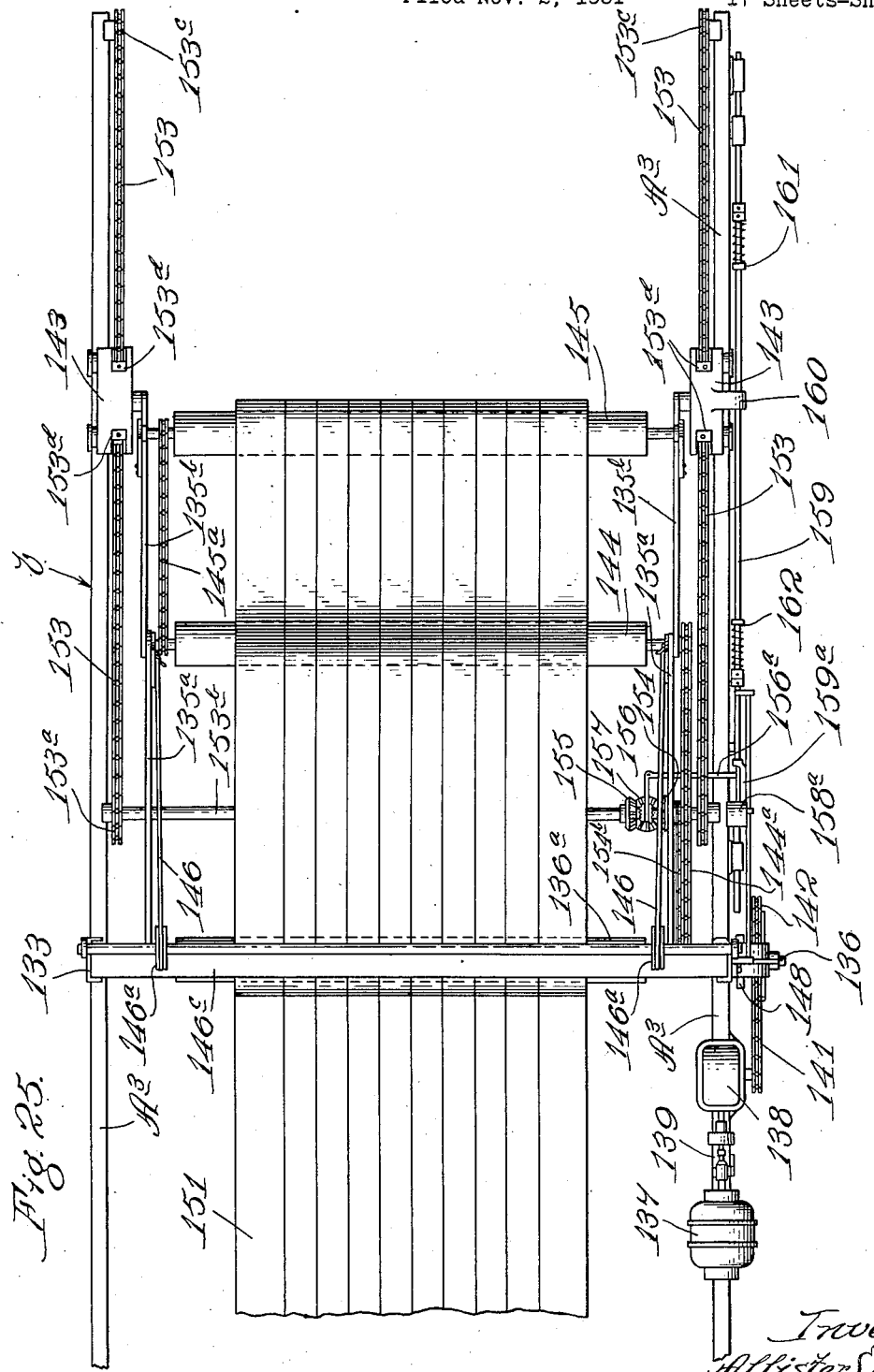

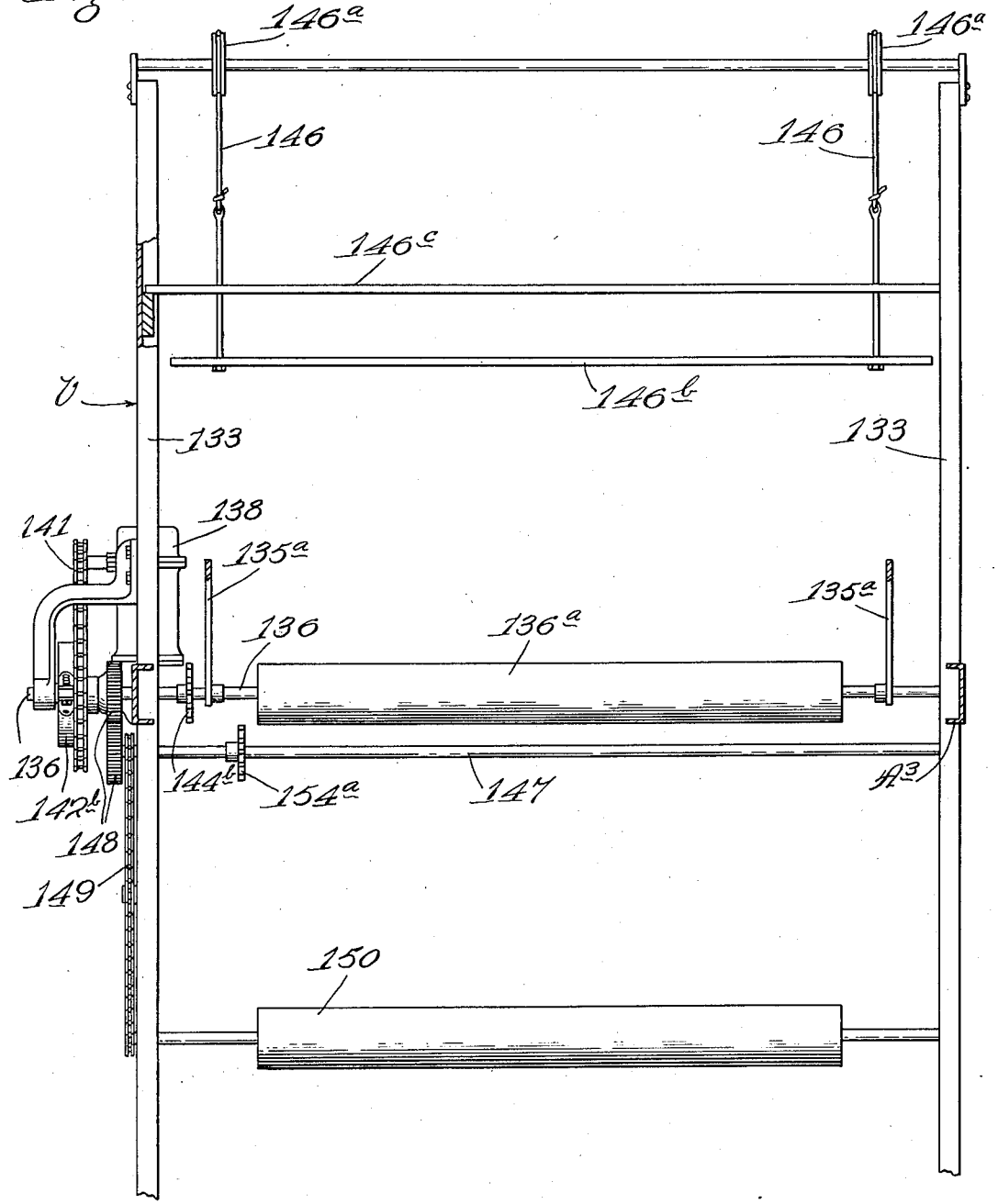

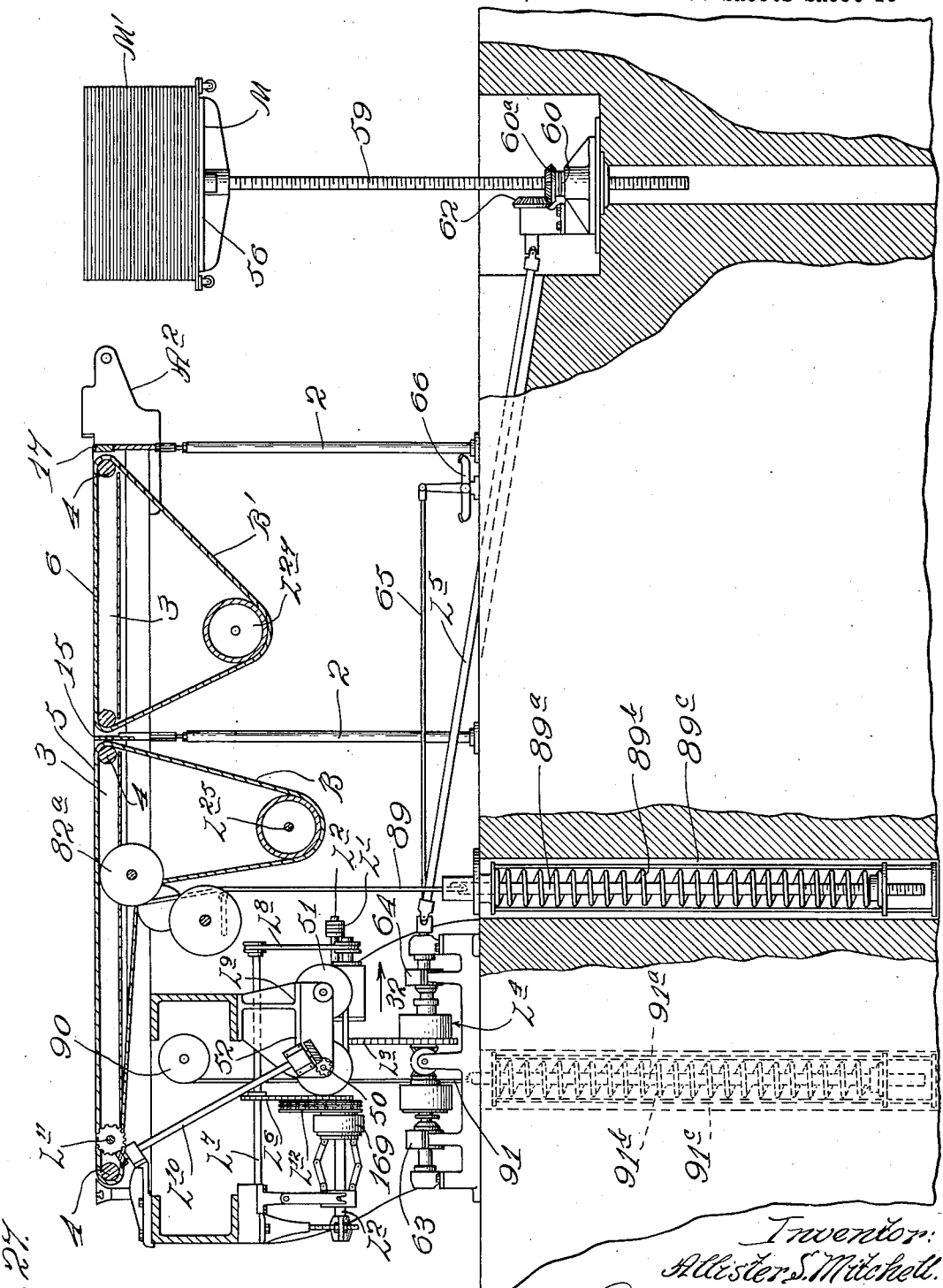

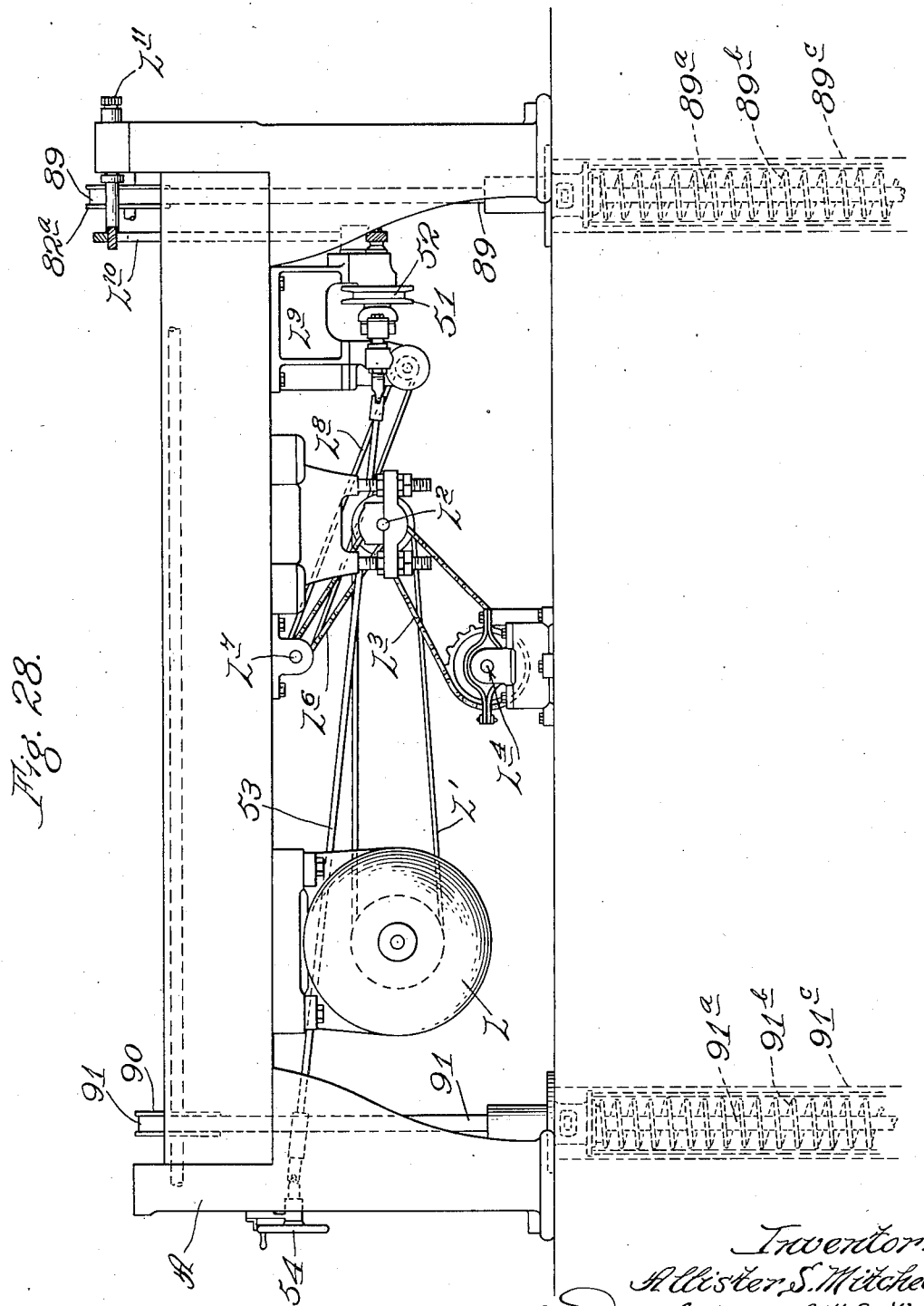

Dec. 24, 1935.  A. S. MITCHELL  2,025,355
UPHOLSTERY MAKING APPARATUS
Filed Nov. 2, 1931  17 Sheets-Sheet 17
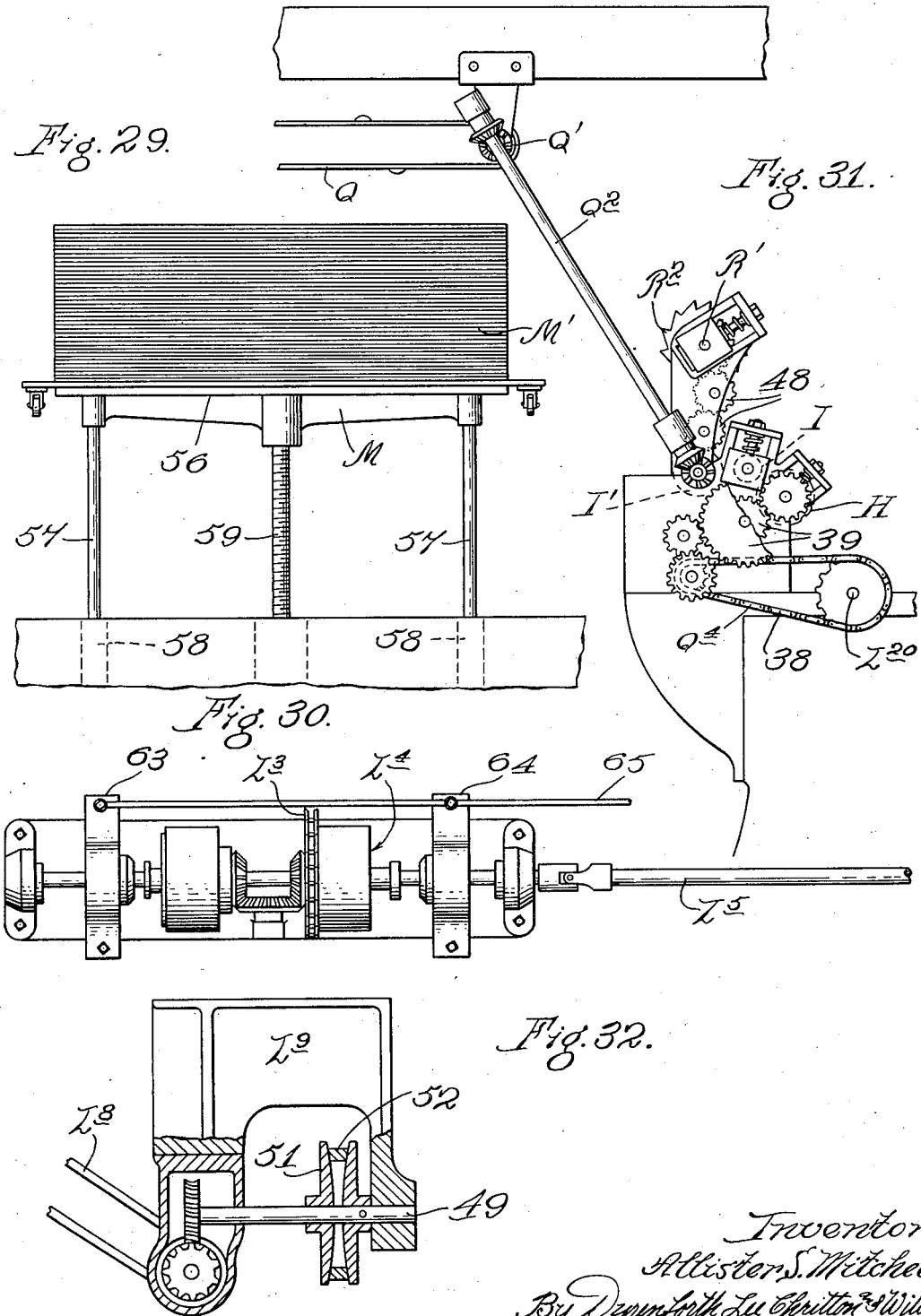

Patented Dec. 24, 1935

2,025,355

UNITED STATES PATENT OFFICE 2,025,355

UPHOLSTERY MAKING APPARATUS

Allister S. Mitchell, Oakland, Calif., assignor to National Automotive Fibres, Inc., Detroit, Mich., a corporation of Delaware Application November 2, 1931, Serial No. 572,691

34 Claims. (Cl. 112—2)

This invention relates particularly to a machine and method for manufacturing stuffed, pleated upholstery. Such a machine is adapted, for example, to the manufacture of automobile seat-cushions, back-cushions, etc.

The primary object is to provide an improved machine and improved method which will greatly facilitate the manufacture of stuffed, pleated upholstery.

More especially, the present invention is intended to provide a machine particularly suited to the use of pre-cut covers in forming cushions, for example, for automobiles.

The objects of the invention are, in a large measure, accomplished by making use of the principle of fluid pressure (through the medium of a suction-carrier) for shaping the main (finish) fabric into pleat-fullnesses and intervening seam-ridges; and, preferably, important novel adjuncts are used in connection with the pneumatic carrier for shaping and feeding the materials through the machine and properly forming the upholstery.

In the use of the improved machine, as preferably constructed, pre-cut covers, a lining-fabric, and strips of batting are fed through the machine, the pre-cut covers being lowermost as the work is fed through the machine; the lining-fabric has formed therein upstanding seam-ridges; the pre-cut covers are fed, seriatim, over a suitable bed and provided with upstanding seam-ridges and intervening depressed pleats, or pipes, the seam-ridges of the covers becoming nested within the seam-ridges of the lining-fabric; strips of cotton-batting, or the like, are drawn through with the fabrics and fill the pleats; and the upstanding, nested seam-ridges of the lining-fabric and of the pre-cut covers (suitably spaced) are sewed by means of sewing mechanisms mounted on a cross-beam above the path of the materials, each sewing-mechanism preferably comprising a head carrying a sewing-needle and looper-needle.

The work is fed continuously through the machine. The lining is a continuous fabric; the cotton batts are continuous strips; and the cover-fabric preferably is pre-cut to provide covers, which, in the operation of the machine are sewed to the lining. If desired, the batts fed to the pleats are periodically broken to correspond with spaces between cushions, so that the upholstery produced is a continuous piece composed of a series of cushions connected by short lengths of lining-fabric. The lining-fabric may be cut at the spaces between cushions to effect separation of the cushions.

In the present invention use is made of a suction-conveyor and associated spaced ridges adapted to form seam-ridges and intervening pleat-fullnesses in a fabric; and, for the purpose of adapting the machine to handle with great facility pre-cut covers, the present invention employs, in combination with the device mentioned, cover-placing mechanism adapted to position the covers, one at a time, over the conveyor and the ridges at the upper side of the conveyor, and co-acting depressing devices, or pleat-formers, which operate to depress linear portions of the cover into the spaces between the ridges and thus bring the cover fabric within the effective action of the suction conveyor. The seam-ridges of the cover are at the same time formed over the ridges associated with the conveyor. Preferably, the formers travel in cycles and are depressed progressively in pairs, first at the medial line of the machine and then in both directions laterally therefrom. The effect is to progressively pleat the cloth over the ridge-bars associated with the conveyor from the intermediate portion of the cloth laterally and progressively in both directions.

The invention is illustrated in a preferred embodiment in the accompanying drawings, in which—

Fig. 1 is a broken front elevational view of an upholstery machine embodying the invention; Fig. 2, a broken side elevational view; Fig. 3, a broken vertical longitudinal sectional view; Fig. 3a a broken perspective view showing a detail of the adjustable chute-devices employed; Fig. 4, a broken detail view illustrating a portion of the super-structure which carries a lining-fabric tensioning device; Fig. 5, a broken side elevational view illustrating a mechanism for actuating the cotton-batt feeding means and mechanisms for actuating the piece-placer and the forming mechanisms employed; Fig. 6, a broken plan view of the machine; Fig. 7, a broken horizontal extended sectional view illustrating the mechanism for actuating the piece-placer and the fabric-forming mechanism; Fig. 8, a broken vertical longitudinal sectional view showing the piece-placer and the forming mechanism mentioned; Fig. 8a, a broken transverse sectional view, taken as indicated at line 8a of Fig. 8; Fig. 9, a broken transverse vertical sectional view taken as indicated at line 9 of Fig. 8; Fig. 10, a broken transverse vertical sectional view, taken as indicated at line 10 of Fig. 6; Fig. 11, a similar sectional view showing the forming-mechanism in lowered position; Fig. 12, a broken longitudinal vertical section, taken as indicated at line 12 of Fig. 14, and showing a portion of the superstructure in which the batt-conveyor is mounted; Fig. 13, a broken elevational view showing a part of the mechanism shown in Fig. 12; Fig. 14, a broken transverse vertical section, taken as indicated at line 14 of Fig. 13; Fig. 15, a broken vertical longitudinal sectional view showing a front portion of a pneumatic conveyor and the cross-head which carries the sewing-mechanisms and attendant devices; Fig. 16, a broken front view partly in section, showing one of the sewing-mechanisms and (in section) a portion of a cushion; Fig. 17, a broken section taken as indicated at line 17 of Fig. 15; Fig. 18, a section taken as indicated at line 18 of Fig. 15, omitting the cross-head; Fig. 19, a broken plan view showing a series of cushions formed by the machine; Fig. 20, a side elevational view illustrating delivery mechanism employed, this mechanism serving to deliver the product, in folded condition, onto a floor truck, if desired; Fig. 21, a broken side elevational view of the delivery-mechanism; Fig. 22, a sectional view, taken as indicated at line 22 of Fig. 21; Fig. 23, a broken plan view of a portion of the mechanism shown in Fig. 21; Fig. 24, a broken vertical section taken as indicated at line 24 of Fig. 23; Fig. 25, a plan view of the delivery-mechanism; Fig. 26, a transverse vertical section taken as indicated at line 26 of Fig. 20; Fig. 27, a broken vertical longitudinal sectional view showing portions of the driving mechanism and showing also an automatically actuated support for pre-cut covers; Fig. 28, a broken front elevational view showing the sub-structure of the frame and illustrating the motor and transmission equipment; Fig. 29, a view of the vertically adjustable cover-support mentioned; Fig. 30, a plan view of the transmission which drives the elevator-actuating shaft shown in Fig. 27, the cover-support being here referred to as an elevator; Fig. 31, a broken side elevational view illustrating the manner in which the batt-conveyor is driven; and Fig. 32, a broken vertical sectional view taken as indicated at line 32 of Fig. 27, the section showing a portion of a variable-speed transmission device through which power is transmitted to actuate cams which control the periodicity of operation of the batt-feeding means and also of the piece-placing means and fabric-forming mechanism.

Describing in detail the preferred embodiment illustrated—

A designates a main frame which is equipped near its front end with a vertically adjustable cross-head A', the frame being provided with a bed-extension $A^2$ over which the covers are fed; $A^3$ a frame-work which serves as a support for a batt-conveyor and other devices disposed over the frame A; B (Fig. 3), a front suction-conveyor mounted in the bed of the machine; B', an auxiliary conveyor disposed back of the conveyor B; $B^2$ (Figs. 3 and 10), longitudinally extending ridge-bars which extend over both conveyors and have their front ends extending through peripheral grooves in a forming-roll mounted on the cross-head mentioned; C (Figs. 1 and 3), a series of sewing-mechanisms mounted on the cross-head A' and laterally adjustable thereon to enable the width of the pleats to be varied, said sewing-mechanism being actuated by a common shaft C', which, as shown in Fig. 1, is driven through the medium of a coupling-shaft $C^2$, from a shaft $C^3$ journaled in the main frame; D (Figs. 1 and 2), a thread-supporting device positioned above the sewing-mechanisms and supported from the frame $A^3$; E, E', a pair of front feed rolls by which the upholstery is drawn through the front end of the machine and from which the upholstery passes to the delivery mechanism which serves to fold it; F, a forming-roll disposed back of and carried by the lower portion of the adjustable cross-head A', said forming-roll having spaced circumferential grooves through which the ridge-bars $B^2$ extend; G (Figs. 15–18), a series of lining-creasers adjustably mounted on a transverse bar G' carried by the bed; H, (Fig. 3), a front batt-feeding roll which coacts with a concave H'; I, I', an auxiliary pair of batt-feeding rolls journaled in supports carried by the main frame, said auxiliary rolls being periodically arrested to cause severance of the batts; J, a shearing edge forming a part of the concave H' and disposed immediately back of the front batt-feeding roll H; K, K (Figs. 2 and 3) mounting blocks carried by the main frame and supporting the batt-feeding rolls and the associated concave; L (Figs. 2, 6, 27, 28 and 32), an electric motor disposed under the front portion of the frame of the machine, which actuates, through the medium of a chain or belt L', a counter shaft $L^2$; $L^3$, a sprocket chain actuated by the shaft $L^2$ and serving to actuate reversing gear mechanism $L^4$ shown in Fig. 30, this mechanism serving to actuate a rearwardly and downwardly inclined shaft $L^5$ which serves to actuate the elevator or fabric-support; $L^6$ a sprocket chain which serves to actuate a jack-shaft $L^7$, which in turn, actuates a belt $L^8$ through the medium of which the variable speed transmission mechanism $L^9$ (Figs. 27, 28 and 32) is actuated; $L^{10}$, a shaft actuated by the variable speed mechanism $L^9$ and serving, in turn, to actuate a horizontal shaft $L^{11}$ (Figs. 5, 27 and 28), the shaft $L^{11}$ serving to actuate a cam-shaft which controls the batt-feeding mechanism and which controls also the piece-placing mechanism and the fabric-forming mechanism; $L^{12}$ (Figs. 2, 6 and 27), a sprocket chain driven by the shaft $L^2$ and serving to drive a shaft $L^{13}$ which, in turn, operates through speed-reducing mechanism $L^{14}$ to actuate the lower upholstery-feeding roll E; $L^{15}$, a sprocket chain actuated from the shaft $L^{13}$ and serving to actuate a short horizontal shaft $L^{16}$, which as shown in Fig. 6 serves to actuate the shaft $C^3$ (Fig. 1); $L^{17}$ a sprocket chain which, as shown in Figs. 6 and 7 driven by the lower feed roll E, and which serves to actuate a shaft $L^{18}$ which is employed to actuate the batt-conveyor and the rear batt-feeding rolls; $L^{19}$ (Fig. 6), a sprocket chain driven by the lower feed-roll E and serving to actuate a shaft $L^{20}$, from which power is communicated through transmission means $L^{21}$ to the forming-roll F; $L^{22}$ a sprocket chain driven from the lower feed-roll E and serving to actuate a short transverse shaft $L^{23}$, which actuates a sprocket chain $L^{24}$ serving to transmit power to a shaft $L^{25}$ which actuates the front suction-conveyor; $L^{26}$, a sprocket chain (Fig. 2) driven by the shaft $L^{25}$ and serving to drive a roll $L^{27}$ which actuates the rear suction-conveyor B'; M (Figs. 2 and 27), a slowly elevated fabric-support, or cover-support which serves to elevate a stack M' of pre-cut covers; N (Figs. 2, 3, 6, 8 and 10), piece-placing mechanism adapted to position the pre-cut covers on the bed of the machine; O (Figs. 2, 6 and 7–11), fabric-forming mechanism cooperating with the suction-conveyors and the ridge-bars in forming the covers into seam-ridges and intervening pleat-fullnesses; P (Figs. 2, 3 and 15), a lining-fabric which is drawn from a roll P' about a tensioning device P² (Figs. 2 and 4) and thence to the forming-roll F; Q (Figs. 2, 3 and 12–14), a batt-conveyor supported on the frame A³, said conveyor having a front propelling-roll Q' which is actuated by a shaft Q² driven (Fig. 6) from a shaft Q³ which, in turn, is driven by a sprocket chain Q⁴ from the shaft L²⁰; Q⁵ batts carried by the conveyor Q and descending from the front end thereof over an inclined plate Q⁶ to the batt-feeding rolls I and I'; R, a series of guides or short chutes mounted on the main frame and serving to guide the batts to the rolls I and I'; and R' a transverse shaft equipped with toothed batt-feeding and directing disks R² which serve to effectively direct and feed the batts through the chutes R.

The frame A may be of any suitable construction. In the illustration given, the bed-extension A² is shown supported at its front end on a pedestal 1 of the main frame, and at its rear end on adjustable legs 2.

The suction conveyors B and B' are shown equipped with open-topped suction-boxes 3 which are equipped with rollers 4 over which the upper lengths of the foraminous belts 5 and 6 pass. The frames, or boxes 3, are supported on adjustable devices 7 so that the conveyors can be raised or lowered, according to the depth of the pleat-fullnesses desired, it being understood that the fabric is drawn downwardly through the spaces between the ridge-bars to bear against the upper length of the suction-conveyor.

The suction boxes are exhausted through pipes 8 and 9 which connect with a pipe 10 which communicates with the in-take portion of an exhaust fan 11. In practice, only a moderate degree of suction is required at the conveyor B, and a still smaller amount of suction is desirable at the rear conveyor B'. The fan is operated (Fig. 2) by an electric motor 12.

As has been stated, the rear suction-conveyor is driven from the front conveyor through the medium of a sprocket chain L²⁶. The ridge-bars B² extend longitudinally over both conveyors. They are adjustably secured at their front ends (Fig. 3), as by bolts 13, to a cross-member 14 of the frame; also, they are adjustably secured at an intermediate point to the cross-member 15 disposed between the conveyors; and they are further adjustably secured at their rear ends, as by bolts 16, to a cross-member 17. These connections permit lateral adjustment of the ridge-bars to enable them to be spaced to produce the desired width of pleat.

It will be noted that the front conveyor extends in front of the sewing-mechanisms and the same is true of the ridge-bars. The ridge-bars register with circumferential grooves 18 (Figs. 3 and 6) of the forming-roll F and also with grooves or spaces between adjustable shoes 19 with which the cross-head is equipped at its lower edge. See also Figs. 16–18.

The seam-ridges 20 of the cover-pieces M' (Fig. 16) are formed over the ridge-bars and pass through the grooves of the forming-roll F and thence to the sewing-mechanisms. During the passage of the materials through the grooves of the forming-roll the seam-ridges 20 become nested within seam-ridges 21 which are formed in the lining P by the lining-creasers G (Figs. 15–18) which coact with the grooves 18 of the forming-roll. The ridges of the members B² are cut away as indicated at 22 (Fig. 15) to permit the sewing-needle to pass through the seam-ridges of the fabrics. As shown in Fig. 16, the shoes 19 are suitably recessed to permit the operation of the needles.

The sewing-mechanisms C may be of any suitable construction and may be operated in any suitable manner. The sewing-mechanisms shown (Figs. 1, 15 and 16) are mounted on laterally adjustable brackets 23 carried by the cross-head A'. The brackets are equipped with bosses 24 concentric with the shaft C', and the frame of the sewing-head is pivotally suspended from the bosses of the brackets.

The sewing-mechanisms need not be described in detail. It may be stated, however, that each sewing-head is equipped with a lever 25 which carries a sewing-needle 25ᵃ and is equipped further with a lever 26 which carries a looper-needle 26ᵃ. These levers are actuated from the continuously rotating shaft C' in a manner which need not be described in detail. The thread which supplies the sewing-needle is designated 25ᵇ, being drawn from a spool 25ᶜ (Fig. 2); and the thread which supplies the looper-needle is designated 26ᵇ, being drawn from a spool 26ᶜ. The sewing-needle operates to thrust the sewing-thread transversely through the nested seam-ridges of the fabrics, and the sewing-thread and the looper-thread become interlooped in a manner now well understood in the art.

The head of each sewing-mechanism is equipped with a seam-embracing shoe 27 (Fig. 16). The fin or rib of the ridge-bar extends into the groove of the member 27 and is cut away at 22, as has been stated.

The thread-supporting device D (Fig. 2) may be of any suitable construction. It is shown as comprising a member 28 upon which the spools of thread are supported, and a member 29 equipped with eyes 30 through which the threads pass. The front feed-rolls E and E' are equipped with gears 31 (Fig. 1). The upper feed-roll is journaled in movable brackets 32 adapted to be moved by a lever 33 to throw the upper-roll to an idle position. Ordinarily the rolls E and E' are covered with rubber and geared to run slightly faster than the suction-conveyor and the forming-roll.

The forming-roll F may be of any desired construction. Ordinarily, it comprises (Figs. 17 and 18) a shaft 34 equipped with adjustable grooved collars 35 in which the grooves 18 are formed. These collars may be suitably spaced on the shaft to correspond with a pleat of desired width. The shoes 19 at the lower edge of the cross-head A' also are adjustably mounted to permit lateral adjustment.

Each of the lining-creasers G (Figs. 15 and 17), comprises a shoe 36 which carries an upwardly and rearwardly inclined arm or blade 36ᵃ. The shoe 36 is adjustably mounted on the cross-bar G' by means of an adjusting bolt 36ᶜ to permit lateral adjustment of the lining-creaser. The shoe 36 has a V-shaped base-portion 36ᵇ which overlies the corresponding ridge-bar. The lower front apex portion of the lining-creaser extends into the groove 18, and thus serves to force a portion of the lining-fabric P into the groove and form a seam-ridge in the fabric. The arms 36ᵃ of the various lining-creasers G vary in height, those at the longitudinal central portion of the machine being longest and the others being gradually reduced in length as the sides of the bed are approached. The result is to gather the lining-fabric first at the central portion and then, in sequence, from the center towards the lateral edges of the fabric. This prevents the fabric from binding. That is, it allows the fabric to be properly gathered, the seam-ridges being formed in sequence from the center outwardly toward the lateral edges of the fabric.

The front batt-feeding roll H operates continuously. All of the batt-feeding rolls preferably are fluted longitudinally as appears from Figs. 3 and 6. The auxiliary batt-feeding rolls I and I' are periodically arrested to cause the batts to be severed between cushions.

In the plan view shown in Fig. 19, the covers of the cushions are designated M' and the lining is designated P. It will be noted that the cushions are separated by short spaces 37, at which points the cushions are connected by the lining-fabric. After a series of cushions, say 100 feet in length, or more, has been formed, the lining-fabric may be severed between the cushions.

The front batt-feeding roll H (Figs. 6 and 31) is driven from the shaft $L^{20}$ through the medium of a sprocket chain 38 and a gear-train 39, the operation being continuous.

Referring to Figs. 5 and 6, the shaft $L^{18}$ is continuously rotated through the medium of the sprocket chain $L^{17}$. Upon the outer end of said shaft is journaled a sleeve 40 equipped with a sprocket wheel adapted to drive a sprocket chain 41. The sleeve 40 is adapted to be clutched to the shaft $L^{18}$ through the medium of a clutch 42 controlled by a lever 43 which is pivotally mounted at $43^a$.

A cam shaft 44 controls the lever 43. This cam shaft is actuated from the shaft $L^{11}$ through the medium of a gear train 45. The shaft 44 is equipped with a cam $44^a$ which is adapted to periodically actuate the lever 43 and disconnect the clutch 42. The shaft 44 is equipped also with a cam $44^b$ adapted to periodically actuate a pivotally suspended arm 46 which is connected by a link $46^a$ to a pivotally mounted arm $46^b$ which is joined by a connecting rod $46^c$ to a pawl or dog $46^d$ which controls the operation of the piece-placing mechanism N and therethrough controls the operation of the fabric-forming mechanism O.

The sprocket chain 41 controlled by the clutch 42 operates a gear train 47 which serves to actuate the intermittently arrested batt-feeding rolls I and I'. The shaft R' is actuated (Fig. 31) by a gear train 48 which is actuated from the batt-feeding roll I'. Also, the shaft $Q^2$ is actuated from the roll I' and serves to actuate the batt-conveyor Q, as will be understood from Fig. 31. Thus, it will be understood that when the operation of the sprocket chain 41 (Fig. 2) is interrupted, the batt-feeding rolls I and I' will stop and also the batt-conveyor Q will stop; also the shaft R' will cease operating temporarily. Inasmuch as the front feeding-roll H continues to operate, the result is to cause the batts to be sheared over the shearing edge J (Fig. 8).

Referring to Figs. 2, 27, 28 and 32, it may be stated that the variable speed device $L^9$ is a well-known device which comprises suitably spaced shafts 49 and 50, which are fitted with disks 51, as shown in Fig. 32. Adjacent surfaces of these disks are beveled and a correspondingly beveled belt or chain 52 is interposed. The rear shaft 49 is driven through the medium of the sprocket chain $L^8$ and motion is communicated to the front shaft 50 through the medium of the belt 52. The mechanism is equipped, as is known, with devices for simultaneously adjusting the disks on the two shafts, so as to open or separate those on one shaft while closing those on the other shaft. This results in varying the speed of transmission from the shaft 49 to the shaft 50. As shown in Fig. 28, the present machine is equipped with a transversely extending shaft 53 which is equipped with a hand-wheel 54. The inner end of the shaft 53 is connected to a push-pull mechanism, well known in the art, adapted to adjust the disks 51 of the mechanism $L^9$, and thus the speed of transmission to the cam shaft 44 (Fig. 5) may be readily controlled, at will. This enables the periodicity of the interruption of the rear batt-feeding rolls and batt-conveyor to be regulated, depending upon the length of the cushion desired. In the same manner, the timing of the piece-placing mechanism N and the fabric-forming mechanism O are controlled.

Referring to Fig. 5, 55 designates an eccentric on a shaft $55^a$ controlled by a hand lever $55^b$. When desired, the eccentric may be thrown to such position as to always keep the clutch 42 engaged, so that the rear batt-feeding rolls and the batt-conveyor will operate continuously. This feature may be employed where it is not desired to break the batts between cushions.

While the machine illustrated is shown adapted to feed precut covers, it will be understood that the machine may be suitably equipped for feeding a continuous cover-fabric, in which event the feature of interrupting the feed of the batts may be employed, or not, at will.

The elevator, or cover-supporting device M is shown (Figs. 27, 29 and 30) as comprising a platform 56 equipped with depending guide-rods 57 which extend into guide holes 58 in the floor, and the platform 56 is equipped centrally with a fixedly secured screw 59 which extends through a suitably journaled nut 60 supported in a recess in the floor. The nut 60 is equipped with a bevel pinion $60^a$ engaged by a bevel pinion 62 actuated by the shaft $L^5$, it being noted that the shaft $L^5$ has suitable universal connections to permit its operation. The mechanism $L^4$ is adapted to turn the shaft $L^5$ in either direction. The clutches which control the operation of the shaft $L^5$ are controlled by levers 63 and 64 which are connected by a rod 65 with a foot-treadle 66, enabling the operator to readily shift the clutches to cause the shaft $L^5$ to rotate in the direction desired. The operator touches the treadle 66 occasionally to cause the elevator to be raised short distances, as required.

The piece-placing mechanism N and the fabric-forming mechanism O are actuated from a common shaft, as will now be explained, reference being made to Figs. 2 and 5–11.

First referring to Figs. 7, the shaft $L^{18}$, which rotates continuously, is equipped with a gear 67 which actuates a companion gear secured on a sleeve 68 and actuates also a sprocket-wheel 69 secured on said sleeve. Motion is transmitted from the wheel 69 through a sprocket chain 70 to a shaft S which rotates continuously. The shaft S serves as a source of power for the piece-placing mechanism N and the fabric-forming mechanism O. Through suitable transmission mechanisms motion is transmitted periodically from the shaft S to a shaft T and also to a shaft U.

From the shaft T, which may rotate in one direction and then in the other, power is transmitted through a sprocket chain T' to an oscillatable shaft $T^2$ which serves to actuate the piece-placing mechanism; and from the shaft U, which is oscillatable, power is transmitted through a sprocket chain U' (Fig. 2) to a shaft U² which actuates the fabric-forming mechanism O.

The shaft S, which rotates continuously, is equipped at its outer end with a friction wheel 71 and at its inner end with a friction wheel 72. Encircling these wheels are friction-bands 71$^a$ and 72$^a$, respectively, adapted to periodically actuate shafts T and U.

The band 71$^a$ is connected by a bolt 73 to an arm 74 which is secured to a sleeve 75, whose inner end acts through a gear train 76 to actuate a sleeve 77, which is journaled on the shaft T. That is, the friction-band 71$^a$ tends at all times to turn and actuate the sleeve, or tubular shaft, 77.

A similar gear train 72$^b$ serves to transmit power to the shaft U from the friction-band 72$^a$. The outer end of the sleeve 77 is equipped (Fig. 5) with a fixedly secured disk 78 which is equipped with a dog 79 which is adapted to engage a block or shoulder 80 carried by a disk 80$^a$ which is fixedly secured on the outer end of the shaft T. The outer end of the shaft is further equipped with an arm 81, which is adapted to serve as a trip.

The disk 78 is normally latched against rotation by the dog 46$^d$ which is controlled by the cam 44$^b$ on the cam-shaft 44.

Upon the shaft U is journaled a tubular shaft 82 upon the inner end of which are fixedly secured a drum 82$^a$ and a sprocket wheel 82$^b$, the latter serving to actuate the sprocket chain U'. Upon the outer end of the tubular shaft 82 is a fixedly secured disk 82$^c$. Upon the outer end of the shaft U is a fixedly secured disk 83 which normally is held against rotation by a latch-dog 84 which is adapted to be tripped by the member 81 carried by the shaft T, the dog 84 normally engaging a block or shoulder 85 with which the disk 83 is equipped. Upon the disk 83 is pivotally mounted a dog 86 which is adapted to engage a block or shoulder 82$^d$ with which the disk 82$^c$ is equipped.

Pivotally supported upon the main frame is a trip-device 87 which is adapted to be actuated by a cam-roller 88 carried by the disk 83. The member 87 is adapted to release the pawl 79 to permit the return movement of the shaft T.

Secured to the drum 82$^a$ which is in turn secured to the sleeve journaled on the shaft U, is a flexible member, or strap 89, which, as shown in Fig. 27, is secured to a plunger 89$^a$ which is yieldingly held in depressed position by a spring 89$^b$ confined in a bore 89$^c$ in the floor. The spring mentioned operates to return the tubular shaft 82 on the shaft U to normal position after the shaft has been rotated to actuate the fabric-forming mechanism.

Upon the shaft T² (Fig. 7) is secured a drum 90 to which is secured a strap 91, which, as shown in Fig. 27, is connected with a plunger 91$^a$ which is yieldingly held in depressed position by a spring 91$^b$ which is confined in a bore 91$^c$ in the floor. The spring just mentioned serves to return the drum 90 on the shaft T² to its normal position and cause retraction of the piece-placing device.

In the operation of the machine, the cam 44$^b$ periodically actuates the arm 46$^b$ and releases the disk 78, thus permitting rotation of the tubular shaft 77 which is journaled on the shaft T. As the disk 78 rotates the dog 79 picks up the disk 80$^a$ at the end of about a half revolution and thus causes the shaft T to rotate a half revolution. During this movement, the arm 81 trips the dog 84 and releases the disk 83, which, through the medium of the pawl 86 picks up the disk 82$^c$ and thus rotates the tubular shaft 82 journaled on the shaft U, thus causing the drum 82$^a$ and the sprocket chain U' to be actuated. In this manner, the fabric-forming mechanism will be actuated through one movement of reciprocation and at the same time the spring 89$^b$ will be compressed and thus placed in readiness to retract the fabric-forming mechanism. At the proper instant, the cam 88 actuates the trip-member 87 and causes the pawl 79 to release its disk 80$^a$; and at about the end of one rotation of the disk 83, the dog 86 is tripped by a cam 92 which is mounted on the main frame, thus releasing the disk 82$^c$ and permitting the tubular shaft 82 and the drum 82$^a$ to return to normal position.

The construction and operation of the piece-placing mechanism N will now be described. The shaft T² serves to actuate a pair of sprocket chains T³ (Figs. 7 and 8) first in one direction and then in the other. One length of each chain extends through a longitudinal tubular guide-member 93 which is fixedly mounted on the bed of the machine, one of these guide-members being located at each side of the bed. Upon each guide-member is mounted a goose-neck slide 94 having a depending member 94$^a$ which, as shown in Figs. 8 and 10, engages a fixed longitudinal guide 95 carried by the frame of the bed of the machine. The ends of each sprocket chain are connected at points 96 and 96$^a$ with the corresponding slide 94. The base-portion of the goose-neck members 94 have bores therethrough which slide on the guides 93. Each goose-neck has a rearwardly extending arm 94$^b$, and the extremities of these arms are connected by a rock shaft 94$^c$.

Secured to the rock shaft 94$^c$ are pusher-arms 94$^d$ whose lower front extremities are equipped with yielding friction-members 94$^e$ (Fig. 3). The members 94$^e$ are adapted to frictionally engage the front corner-portions of a cover-fabric and slide the fabric forwardly over the suction-conveyor into proper position to be engaged by the fabric-former. As shown in Fig. 10, thin brass strips 95 preferably extend longitudinally over the conveyor near the lateral edges of the conveyor, and the pusher arms, sliding on these strips, grip the marginal portions of the fabric and effect the forward movement of the fabric during the forward travel of the piece-placing device.

The rock-shaft 94$^c$ is equipped with a pair of fixedly secured arms 97 which are connected by rods 98 with arms 99 (Figs. 3 and 8) secured to a rock shaft 99$^a$, which, in turn, is equipped with a pair of longitudinal actuating arms 99$^b$. Upon the rods 98 are springs 98$^a$ which have one end attached at 98$^b$ to the arms of the goose-necks, while the other ends of said springs are attached to the arms 97. Thus, the springs tend to throw the pusher-arm 94$^d$ downwardly against the suction-conveyor. As shown in Fig. 8, the base-portions of the goose-necks are equipped with latches 100 which are adapted to engage latch-members 100$^a$ secured to the arms 99$^b$. At the end of the forward movement of the piece-placing mechanism the arms 99$^b$ strike against stops 101 and thus cause the rods 98 to actuate the rock shaft 94$^c$ and lift the pusher-arms 94$^d$. When this occurs, the arms 99$^b$ are latched by the members 100 so that the pusher arms remain in the lifted position during the retraction of the piece-placing device. As shown in Fig. 8, the frame of the bed of the machine is equipped with brackets 102 having mounted on their upper ends spring-held pivoted trips 102$^a$ over which the latch-members 100 ride freely as the piece-placing device nears the rear end of its traverse. When the piece-placing device starts to move forwardly, the pivoted trip-members 102$^a$ are held against turning and thus serve to trip the latch members 100 and permit the springs 98$^a$ to actuate the rock shaft 94$^c$ and depress the pusher-arms to operative position.

The fabric-forming mechanism O, as has been stated, is actuated by the sprocket chain U' and shaft U$^2$ (Fig. 2). Upon the shaft U$^2$ are secured pinions 103 which are adapted to actuate rack-bars 104 secured to slides 105 mounted upon guide-members 106 forming a part of a frame 107 which is mounted at the front end upon frame-members 108 carried by the main frame and which is supported at the rear end upon hangers 109 suspended from the frame A$^3$. The frame 107 also is equipped with fixed rack-bars 110 which are spaced some distance above the guides 106.

The slides 105 are equipped with vertical guides 105$^a$ through which work plungers 111 upon which is supported a cyclically moving frame 112 (Figs. 6, 8 and 10), comprising cross-members 112$^a$, fittings 112$^b$, and longitudinal connecting members 112$^c$ joining the fittings 112$^b$ in pairs. Through the fittings 112$^b$ work vertical plungers 113 which are equipped at their lower ends with former-bars 113$^a$. Springs 113$^b$ tend to depress the former-bars. As shown in Fig. 10, the intermediate bars 113$^a$ are normally lower than the remaining bars; and the other bars are progressively at higher and higher levels passing from the longitudinal center towards the sides of the machine. In the forming operation, the intermediate bars engage the fabric first; then the next adjacent pair; then the next adjacent pair, and so on. The purpose is to prevent binding of the fabric as it is formed into seam-ridges and intervening pleat-fullnesses over the ridge-bars B$^2$. The frame 112 is equipped further above the lateral margins of the suction-conveyors with gravity-depressed plungers 113$^c$, on the lower end of which are mounted longitudinally disposed friction-rolls 113$^d$. The function of the rolls 113$^d$ is to engage the lateral margins of the cover-fabric lightly and thus apply a desirable degree of tension to the lateral margins of the fabric while the cloth is being gathered by the formers.

It may be remarked that the shaft L$^2$ is driven continuously by the motor L. In practice, power is taken from the shaft L$^2$ through the medium of a clutch 169 (Fig. 27), the sprocket chains L$^3$, L$^6$ and L$^{12}$, through which power is delivered to the various mechanisms being actuated from the clutch on the shaft L$^2$. The clutch mentioned is controlled from the lever 140 which controls a delivery-mechanism V of the apparatus, or from any other suitable lever by connecting means (not shown).

The frame 112 is suspended on connecting rods 114 whose upper ends are connected with cranks 114$^a$ (Fig. 9). The cranks are secured to shafts 114$^b$ which are equipped with pinions 114$^c$ which engage the fixed rack-bars 110.

The shafts 114$^b$ are equipped with friction wheels 114$^d$ which are engaged (Fig. 2) by a friction-band 114$^e$. The friction-devices serves to hold the crank-arms 114$^a$ normally in standing position, as shown in Fig. 3. During the forward traverse of the slides 105, the pinions 114$^c$ cause the cranks to rotate and lower the formers 113$^a$ onto the bed, or suction-conveyor. During this operation, the frame 112 is being carried forwardly, so that the formers move with the traveling conveyor. As has been indicated, the formers in proper sequence come into contact with the fabric which is being formed over the ridge-bars, the formers operating from the longitudinal central portion outwardly, in pairs. As the frame 112 approaches the front end of its traverse, the formers are returned to the elevated position; and during the return movement of the frame, the pinions 114$^c$ work idly, the cranks 114$^a$ remaining in the standing position shown in Fig. 3. This idle movement is permitted by a suitable ratchet connection, indicated at 115 (Figs. 8 and 10). It may be remarked that the friction drum 114$^d$ is directly secured to the shaft 114$^b$, while the pinion 114$^c$ is journaled on the shaft. The clutch-device 115 is interposed between the drum 114$^b$ and the pinion 114$^c$.

As shown in Figs. 2 and 3, the frame 112 of the forming-mechanism preferably is supported by a counter-weight. This is effected by means of links 116 connected with the upper ends of the plungers 111 and also connected with counter-weight levers 116$^a$, as shown in Fig. 2.

The batt-conveyor Q is shown in Figs. 2, 12–14 and 31. As has been stated, it is actuated through the medium of the shaft Q$^2$ which operates the front roll Q'. The rear end of the conveyor is supported by a roll 117. Back of the roll 117 is located a roll 118 which is actuated from the roll 117 by means of a sprocket chain 119. Above the roll 118 is disposed a companion roll 120 which is journaled in a frame or bracket 121 carried by a rock-shaft 122 which is adapted to be actuated by a hand lever 123 to throw the roll 120 to inoperative position. The frame or bracket 121 is adapted to be supported by pins or stops 124. When desired, the roll 120 may be thrown to inoperative position to enable cotton batts to be passed between the rear rolls.

In the rear of the batt-conveyor is a transverse shaft 125 equipped with spacers 126 between which the strips of batting may be passed. The batts may be introduced between the rolls 118 and 120 and fed forwardly by the conveyor until the front ends of the batts enter the chutes or guides R and are engaged by the toothed disks R$^2$. In this manner, it is possible to feed with ease fresh batts forwardly into position to pass through the machine.

Referring to Fig. 3$^a$, it may be said that the chutes R preferably are provided by employing a series of members 127, each member being adapted to form a portion of a chute or guide. Thus, in Fig. 3, it will be noted that the members 127 are mounted upon an upwardly and rearwardly inclined plate 128 which is fitted with a window 128$^a$. Each member 127 comprises a shank-portion 127$^a$ and two wings 127$^b$, each shaped to form the sidewall of a chute. By properly spacing two members on the plate 128, a chute adapted to confine the batting-strip is provided. The walls of the wings 127 flare sufficiently to enable the batting-strip to be readily guided into the chute. Also, the sidewalls of the wings 127$^b$ are made concave, so that the upper flanges will partially overlie and partially underlie the batting strip. The effect is to give an enlarged admission end at the upper end of the chute; and the toothed disk R$^2$ shown in Fig. 3a serves to engage the batt along its longitudinal center and positively feed it into and through the chute. In Fig. 6, two of the toothed disks R$^2$ enter the chute, but a single disk may be employed, as shown in Fig. 3a. The inclined plate 128 which forms a foundation for the members 127 is supported at its lower portion on a heavy frame-member 129. The plate and the member 129 are provided with a T-slot 130 adapted to accommodate nuts 130ª engaged by bolts 130ᵇ, this arrangement permitting lateral adjustment of the members 127 to correspond with the position and the width of the pleats.

Referring to Figs. 2, 8 and 8a, as previously stated, the pneumatic conveyors B and B' are vertically adjustable to enable the depth of the pleat-fullnesses to be regulated. This is accomplished by mounting on the longitudinal frame-members 131 of the bed, upright brackets 7 equipped with slots 132, which are adjustably connected with the suction-boxes 3 of the conveyors by means of bolts 132ª. Thus, the conveyors may be raised and lowered to regulate the depth of the pleat. In this manner, more bulky batting strips may be used without necessarily increasing the width of the pleats.

The delivery-mechanism mentioned above, which operates to deliver a connected series of cushions in folded condition to a floor-truck will be understood by reference to Figs. 20-26. The mechanism, as a whole, is designated V. The end of the main machine at which the sewing-mechanisms are located has been designated the front end of the machine notwithstanding that the work is fed in that direction. The delivery mechanism is located in advance of the front end of the main machine. The upper frame-structure A³ is extended forwardly and serves as a part of the frame-work for the delivery-mechanism, as will be understood from Fig. 20. The frame-work A³ is here supported by vertical frame-members 133 and 134.

The delivery-mechanism V comprises an expanding and contracting inverted V-shape apron 135 mounted on the frame-work; a main shaft 136 concentric with which the rear leg of the conveyor 135 is pivotally supported; and an electric motor 137 which serves to operate a gear-train in a gear-box 138 from which power is transmitted to the conveyor 135; a clutch 139 which controls the operation of the gear-mechanism in the gear-box 138; and a clutch-controlling device 140ª equipped with a hand lever 140 which is mounted on the front end of the frame A in the main machine.

Power is transmitted from the gear-mechanism at 138 through a sprocket chain 141 to a sprocket wheel 142 which is equipped with a laterally projecting stud 142ª which serves to actuate a friction band 142ᵇ which encircles a friction drive-wheel 142ᶜ which is keyed upon the shaft 136. The shaft 136 is equipped with a roll 136ª which is located at the pivoted end of the leg 135ª of the V-shape or camel-back conveyor. The other leg 135ᵇ of the conveyor is mounted on a carriage 143 which travels on the frame-members A³. At the apex of the conveyor is journaled a roll 144 which is actuated by a sprocket chain 144ª driven by a sprocket-wheel 144ᵇ on the shaft 136. Near the foot of the leg 135ᵇ is journaled a roll 145 which is driven from the roll 144 through the medium of a sprocket chain 145ª. The frame of the folding conveyor has attached to its apex-portion cables 146 which pass over guide wheels 146ª and are attached to a weight-bar 146ᵇ, which is adapted to pick up the second weight-bar 146ᶜ (Fig. 26). Thus, the folding conveyor is suitably counter-weighted.

As shown in Figs. 21-26, a shaft 147 is journaled in the frame-members 133 below the shaft 136, and is driven from the shaft 136 by gears 148. A sprocket chain 149 extends downwardly from the shaft 147 and serves to drive a lower roll 150, which is the first roll engaged by the upholstery, designated 151 (Figs. 19 and 20) after the upholstery leaves the front feed rolls E and E' of the main machine. The upholstery passes beneath and in front of the roll 150, thence back of the roll 136ª, thence upwardly over the apex roll 144, thence downwardly over the roll 145, and finally is deposited upon a truck 152 located on the floor beneath the track upon which the camel-back is mounted.

The carriage 143 which supports the front leg of the folding conveyor 135 is reciprocated by sprocket chains 153 actuated by sprocket wheels 153ª fixed on a shaft 153ᵇ. The lower length of each sprocket chain 153 passes under the carriage 143 and about a sprocket wheel 153ᶜ. The ends of the sprocket chains are connected to brackets 153ᵈ.

Upon the shaft 153ᵇ are journaled a pair of bevel gears 154 and 155. Between these gears is a clutch 156 splined upon the shaft 153ᵇ. The bevel gear 154 is driven from the shaft 147 by sprocket wheels 154ª connected by a sprocket chain 154ᵇ. The bevel gear 154 operates continuously and drives the bevel gear 155 continuously through the medium of a horizontal bevel gear 157. The clutch 156 is adapted to be shifted by a lever 156ª which is pivotally supported upon a stationary member at 156ᵇ. The lever 156ª is in the form of a bell-crank lever having an actuating arm which engages a yoke 158 carried by a weight arm 158ª which is pivotally supported at 158ᵇ.

The weight-arm 158ª serves as a trip-arm. It is actuated by a longitudinally extending trip-rod 159 which is supported in suitable guides adjacent the traverse of one end of the carriage 143. The rod 159 is equipped with a loop 159ª through which the trip-arm 158ª extends.

The rod 159 extends freely through a perforate lug 160 on the carriage 143. Said rod is further equipped with yieldingly mounted stops 161 and 162. The trip-rod 159 is adapted to be actuated in one direction when the carriage 143 approaches the front end of its traverse and is adapted to be actuated in the opposite direction when the carriage approaches the rear end of its traverse. Thus, the trip-arm 158ª will be thrown first to one side and then to the other side of a vertical line through the pivot 158ᵇ. A suitably supported frame member 163 is equipped with stops 163ª and 163ᵇ adapted to limit the movements of the trip-arm. Thus, it will be understood that the trip-arm 158ª, by actuating the clutch 156 in one direction or the other, serves to connect the shaft 153ᵇ to one or the other of the oppositely rotating bevel-gears 154 and 155, so that the carriage 143 will be reciprocated to cause the folding conveyor 135 to deposit the upholstery in folded condition upon the truck 152, as shown in Fig. 20.

The feed-rolls E and E' of the main machine operate to draw the upholstery through the upholstery-making machine, said feed-rolls preferably having a slightly greater surface speed than that of the front suction-conveyor. The motor 137 of the delivery-mechanism V preferably operates at a speed to drive the rolls of the delivery-mechanism at a somewhat higher surface speed than that of the rolls E and E'. For example, the motor 137 may operate to drive the friction-band 142ᵇ say five to ten percent faster than is required to drive the rolls of the delivery-mechanism at a somewhat higher surface speed than the surface speed of the feed-rolls E and E'. Slippage occurs in the transmission between the band 142ᵈ and the friction-driven wheel 142ᶜ. Thus, the tendency of the rolls of the delivery-mechanism is to impart a pull on the upholstery passing over the folding conveyor of the delivery-mechanism. The upholstery preferably is threaded to pass in front of the roll 150 and back of the roll 136ᵃ. If desired, a weight-roll (not shown) may be employed to press the upholstery against one of the rolls of the delivery-mechanism, thus increasing the tractive force exerted by the rolls of the delivery-mechanism.

The clutch 139 may be of any suitable construction to enable the motor to be connected to drive the gear-train in the box 138.

Referring to Figs. 2 and 4, the roll of lining-fabric P' is shown supported on a pair of small rollers 164, one of which is equipped with a brake 164ᵃ which may be adjusted by means of a weighted lever 164ᵇ.

Referring to Figs. 2, 4 and 12, the lining P passes about the tension-device P², and thence over a roll 165 supported on the frame-members A³. The tension-device P² comprises a frame 166 secured on a shaft 166ᵃ which is equipped with a lever 166ᵇ and with a fixedly secured pinion, or ratchet-wheel, 166ᶜ, which is engaged by a retractable pawl 166ᵈ. The frame 166 is equipped with transversely extending rods 166ᵉ about which the lining-fabric passes in such manner as to give tension to the fabric. By angular adjustment of the shaft 166ᵃ, the tension may be varied.

From the roll 165, the fabric passes downwardly over the lining-creasers G shown in Fig. 15.

Referring to Fig. 2, 167 designates an additional roll of lining in position for use when the roll P' becomes exhausted.

The means for supporting rolls of batts, or cartons of folded batts, is not shown in the drawings. It will be understood that any suitable means for this purpose may be located under or back of the rear portion of the batt-conveyor Q shown in Fig. 12. The ends of the batts may be introduced between the rolls 118 and 120 and the batts will then be fed forwardly automatically and delivered into the chutes, or passages R, adjacent the batt-feeding rolls I and I'.

Briefly stated, the operation of the machine is as follows:

Pre-cut covers M' are supported on the elevator M. These covers are placed by hand on the rear suction-conveyor B'. At the proper moment the piece-placing mechanism N operates to feed a cover forwardly into position under the fabric-forming mechanism O. Preferably, the front suction-conveyor B operates somewhat faster than the rear-suction conveyor so that a certain amount of retarding action is exerted by the rear conveyor, thus causing the fabric to be stretched properly. At the proper instant, the fabric-forming mechanism operates to lower the forming bars 113ᵃ and carry them forwardly as the operation of forming the fabric over the ridge-bars B² proceeds. The forming mechanism is then lifted and latched in the elevated position during the return stroke of the forming-mechanism.

The lining-fabric P passes back of the forming roll F and in front of the lining-creasers G, these parts cooperating to form seam-ridges in the lining-fabric which receive therein the seam-ridges of the covers as the covers pass, seriatim, beneath the forming-roll. The seam-ridges are sewn together by the sewing-mechanism C. The upholstery passes from the sewing-mechanisms between the feed rolls E and E' which exert a forward pull upon the upholstery. The upholstery then passes about the delivery-mechanism V and said delivery-mechanism operates to deliver the upholstery, in folded condition, upon the floor-truck 152, as shown in Fig. 20.

The cam-shaft 44 (Fig. 5) controls the operation of the batt-conveyor Q, the rear batt-feeding rolls I and I', and the shaft R' which actuates the saw-toothed disks which engage the batts; and the cam-shaft 44 also controls the actuation of the oscillating shafts T and U (Fig. 5) which control the actuation of the piece-placing mechanism N and the fabric-forming mechanism O. The shaft S (Figs. 5 and 7), which is continuously driven, serves to transmit power to the shafts T and U when the latter are permitted to operate to actuate the piece-placing mechanism and the fabric-forming mechanism.

The toothed disks R² not only aid in feeding the batts but perform the further function of creasing the batts centrally, longitudinally on the side which will lie adjacent the lining-fabric. This has the further effect of nicely rounding the surface of the batt which lies in the pleat adjacent the cover-fabric, so that nicely filled, well-curved pleats are presented at the finish-fabric side of the cushion.

The cross-head A' which carries the sewing-mechanism is vertically adjustable through the medium of vertically disposed screws 168 (Fig. 1) in a manner now understood in the art.

The present invention constitutes an improvement upon the invention described in my pending application 432,438, filed October 30, 1930.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In combination in a machine of the character set forth: a bed provided with spaced longitudinal ridges over which a fabric may be formed; piece-placing mechanism adapted to carry cover-fabrics forwardly to forming position; fabric-forming mechanism disposed over said bed equipped with cyclically moving fabric-depressing members; actuating means for said piece-placing mechanism; a cam controlling the operation of said actuating means; and actuating means for said fabric-forming mechanism controlled by said first-named actuating means.

2. A machine as specified in claim 1, in which each actuating means specified includes an oscillatable shaft and friction-driven means tending to actuate such shaft in one direction.

3. A machine as specified in claim 1, in which each actuating means mentioned includes an oscillatable shaft and friction-driven means tending to actuate such shaft in one direction, and in which the oscillatable shaft of the actuating means of the piece-placing mechanism controls a pawl, which, in turn, controls the operation of the oscillatable shaft of the fabric-forming mechanism.

4. In a machine of the character set forth:

reciprocable piece-placing mechanism; reciprocable fabric-forming mechanism equipped with depressible fabric-depressing members; actuating means for said piece-placing mechanism, including an oscillatable shaft; actuating means for said fabric-forming mechanism including an oscillatable shaft; a continuously driven shaft; gear trains between said last-mentioned shaft and said oscillatable shafts; friction devices connected with said continuously rotating shaft and adapted to actuate said gear-trains; a continuously rotating shaft equipped with a cam; and means controlled by said cam and controlling the operation of said oscillatable shafts.

5. Mechanism as specified in claim 4, in which the last-mentioned means comprises a device which controls the actuation of the oscillatable shaft of the piece-placing mechanism and comprises means controlled by said shaft, which in turn controls the operation of the oscillatable shaft of said fabric-forming mechanism.

6. In a machine of the character set forth: a bed equipped with spaced, longitudinal ridges over which a fabric may be formed; a reciprocable piece-placing mechanism; a reciprocable fabric-forming mechanism; actuating means for the piece-placing mechanism and the fabric-forming mechanism, comprising a continuously rotating shaft, friction transmission devices mounted on said shaft, oscillatable shafts geared to said friction transmission devices, one of said oscillatable shafts controlling the actuation of the piece-placing mechanism and the other controlling the operation of the fabric-forming mechanism, and latch-devices controlling the operation of said oscillatable shafts.

7. Mechanism as specified in claim 6, in which one of said latch-devices is cam-controlled and controls the actuation of the oscillatable shaft of the piece-placing mechanism and another of the latch-devices controls the actuation of the oscillatable shaft of the fabric-forming mechanism, and is in turn controlled by the oscillatable shaft of the piece-placing mechanism.

8. Mechanism as specified in claim 6, in which the oscillatable shaft of the piece-placing mechanism is driven through the medium of a tubular shaft equipped with a ratchet disk which forms a portion of the latch-device which controls the operation of the oscillatable shaft of the piece-placing mechanism.

9. Mechanism as specified in claim 6, in which the oscillatable shaft of the piece-placing mechanism controls a pawl which in turn controls the release of the oscillatable shaft of the fabric-forming mechanism and in which the means for actuating the oscillatable shaft of the piece-placing mechanism includes a pawl whose release is controlled from the oscillatable shaft of the fabric-forming mechanism.

10. In a machine of the character set forth: a bed equipped with spaced longitudinal ridges over which a fabric may be formed; a reciprocable piece-placing mechanism; a reciprocable fabric-forming mechanism; actuating means for the piece-placing mechanism, including an oscillatable shaft equipped with an actuating ratchet disk, a tubular shaft journaled on the oscillatable shaft and equipped with an actuating disk carrying a pawl adapted to actuate said first-mentioned disk; actuating means for the fabric-forming mechanism comprising a shaft equipped with a disk which serves as a latching-disk and which is equipped also with an actuating pawl, an oscillatable tubular shaft journaled on said last-mentioned shaft and equipped with an actuating ratchet disk adapted to be actuated by said last-mentioned pawl; a continuously driven actuating shaft equipped with two friction-transmission devices, one of which is geared to said first-mentioned tubular shaft and the other of which is geared to the first-mentioned shaft of said fabric-forming mechanism; a latching pawl engaging the first-mentioned disk of the actuating means for the fabric-forming mechanism; a trip-device mounted on the first-mentioned shaft adapted to release said latching pawl; a latching pawl engaging the first-mentioned disk of the actuating means of said piece-placing mechanism; and a continuously rotating cam controlling said last-mentioned latching pawl.

11. In a machine of the character set forth: a bed equipped with spaced longitudinal ridges over which a fabric may be formed; fabric-forming mechanism disposed over said bed and equipped with depressible fabric-forming members; actuating means for said fabric-forming mechanism; a cam controlling the operation of said actuating means; and variable speed transmission means through the medium of which said cam is actuated.

12. Mechanism as specified in claim 11, in which a manual adjusting device accessible at one side of the machine is employed for adjusting said variable speed transmission means.

13. In a machine of the character set forth, piece-placing mechanism, comprising: a bed; a pair of reciprocating slides adjacent to said bed; means for actuating said slides; pusher-arms mounted on said slides and extending downwardly towards said bed; and means for automatically raising and lowering said pusher-arms.

14. Mechanism as specified in claim 13, in which the pusher-arms are carried by a rock-shaft mounted on said slides and a latch-device is employed for controlling the position of said rock-shaft.

15. Mechanism as specified in claim 13, in which a spring-actuated rock-shaft is mounted on said slides and carries said arms and in which a second rock-shaft equipped with a latch-device is employed for controlling the position of the first-mentioned rock-shaft.

16. In a machine of the character set forth: piece-placing mechanism comprising: a reciprocating carriage; pusher-arms movably mounted on said carriage; and means controlling the position of said pusher-arms, including a latch-device mounted on the carriage and stationary devices coacting with said latch-device near the ends of the traverse of said carriage.

17. In a machine of the character set forth: a bed over which cover-fabrics may be moved; means associated with said bed for forming a fabric as it is moved over the bed; means for effecting feeding of the fabric; and a fabric supporting an elevating device adapted to be actuated by the mechanism which serves to actuate the means for feeding the fabric.

18. In a machine of the character set forth: mechanism for forming and sewing pleated upholstery comprising a lining-fabric and pre-cut covers; and an associated cover-supporting and elevating device adapted to be actuated from said first-mentioned mechanism.

19. In a machine of the character set forth: a bed over which cover-fabrics may be moved and shaped to form seam-ridges and intervening pleat-fullnesses; a cover-supporting and elevating device adjacent the rear end of said bed; and means for actuating said device, at will.

20. In an upholstery machine of the character set forth: a bed over which cover-fabrics may be moved and shaped to form seam-ridges and intervening pleat-fullnesses; a cover-supporting and elevating device adjacent the rear end of said bed; a screw for actuating said elevating device; nuts supporting said screw; a longitudinal shaft extending under the bed of the machine and projecting rearwardly beyond the end of said bed, said shaft being geared to said nut; mechanism for actuating said shaft; a clutch controlling said mechanism; and driving-means for said clutch forming a portion of the mechanism of the upholstery making machine; manual actuating means for said clutch disposed near the rear end of the machine.

21. In a machine of the character set forth: a bed equipped with longitudinal ridge-bars over which a fabric may be formed; a pair of aligned suction-conveyors mounted in said bed, and means for operating the front conveyor at a given speed and the rear conveyor at a slower speed.

22. In a machine of the character set forth: a cross-head; sewing-mechanisms mounted on said cross-head; a forming-device at the lower portion of said cross-head provided with spaces through which seam-ridges may pass; a bed over which a lower fabric may be passed beneath said forming-device; means for forming seam-ridges and intervening pleat-fullnesses in a fabric passing over said bed; means for supporting a second fabric at a distance above the bed and conducting the same to and under said forming-device; batt-guides disposed above said bed in the rear of said forming-device; batt-conveying means disposed at a distance above said bed and having means for automatically advancing the leading ends of separate, independent batts from the rear portion of the conveying means forwardly into said guides and a toothed disk associated with each of said guides and serving to positively engage the batt and force it through the guide.

23. In a machine of the character set forth: a bed equipped with means for supporting and feeding a fabric; a cross-head disposed over the front portion of said bed and equipped with sewing-mechanisms; a forming-device at the lower edge of said cross-head having passages through which extend means for conducting seam-ridges to the sewing-mechanisms; a concave disposed over the bed in the rear of said forming-device; batt-feeding rolls associated with said concave; batt-guides disposed back of said batt-feeding rolls; a toothed disk extending into each guide and adapted to positively engage batts directed to said guides; an endless batt-conveyor adapted to automatically advance the leading ends of independent, separate batts to said guides; and means at the rear end of said conveyor for engaging the advance ends of batts and positively feeding the batts forwardly over the conveyor and in conjunction with the movement thereof.

24. In a machine of the character set forth: a pair of positively actuated batt-feeding rolls; batt-guides back of said rolls; positively actuated toothed devices projecting into said guides; an inclined wall over which batts may pass to said guides; and a conveyor extending rearwardly from the upper end of said wall, said conveyor having at its rear end means for biting the advance ends of separate, independent batts and positively feeding the batts onto the conveyor, said conveyor operating to automatically advance the leading ends of said batts into said batt-guides.

25. In combination: an upholstery-forming machine having means for feeding and sewing fabrics to form pleats and introducing batts into said pleats; and delivery-mechanism receiving the upholstery from said machine and driven in timed relation with respect thereto, said delivery-mechanism comprising a device for effecting folding and stacking of the upholstery.

26. In combination: an upholstery-forming machine having mechanisms for sewing together fabrics to form pleats and introducing batts into said pleats; an expanding and contracting conveyor supported above the plane at which delivery is effected from said upholstery-forming machine and so driven as to exert a pulling action on upholstery issuing from said machine; and means for actuating said conveyor and causing the front leg of the conveyor to reciprocate, whereby upholstery passing over said conveyor will be folded zig-zag and deposited in a stack beneath the advance end of the conveyor.

27. In apparatus of the character set forth: an upholstery-forming machine equipped with means for sewing fabrics together and forming pleats therein and equipped with means for introducing batts into the pleats as they are formed; feed rolls disposed at the front end of the upholstery-forming machine co-acting with said feed-rolls; and delivery-mechanism to tension the upholstery comprising a V-form conveyor having its rear leg pivotally supported in a given relation with respect to said feed-rolls and having the lower end of its front leg reciprocatingly mounted, whereby upholstery passing from said upholstery-forming machine through said delivery-mechanism will be folded in zig-zag form beneath the advance leg of said conveyor.

28. Apparatus as specified in claim 27, in which the conveyor of said delivery-mechanism is actuated through the medium of a slip clutch.

29. Apparatus as specified in claim 27, in which the conveyor of said delivery-mechanism is operated through the medium of a slip-clutch and one member of said slip clutch is actuated by clutch-controlled transmission mechanism.

30. In apparatus of the character set forth: an upholstery-forming machine equipped with means for sewing fabrics together and forming pleats and with means for introducing batts into said pleats as they are formed; an elevated frame in advance of said upholstery machine; and delivery-mechanism mounted on said frame co-acting with the upholstery-forming machine comprising a V-form conveyor having a rear leg which is pivotally supported at its lower end and having a front leg which is reciprocatingly mounted at its lower end, a motor mounted on said frame above the front end of said upholstery-forming machine, transmission mechanism between said motor and said conveyor equipped with a clutch and a clutch-controlling device comprising a lever located adjacent the front end of said upholstery-forming machine.

31. Apparatus as specified in claim 30, in which a slip-clutch is interposed between said transmission mechanism and said conveyor.

32. In apparatus of the character set forth: an upholstery-forming machine equipped with means for sewing fabrics together and forming pleats and equipped with means for introducing batts in the pleats as they are formed; said machine being equipped at its front end with feed-rolls through which the upholstery passes; and delivery-mechanism co-acting with said feed-rolls comprising an elevated expanding and contracting conveyor having a reciprocably mounted delivery-end adapted to deposit the upholstery in zig-zag folded condition, and means for guiding upholstery from said feed-rolls upwardly to and onto said conveyor, said delivery mechanism being adapted to impart pull to the upholstery issuing from the upholstery-forming machine.

33. In an upholstery-making machine; fabric-feeding and sewing mechanism serving to form pleats; a batt-conveyor; individual chutes for receiving batts delivered by said conveyor, through which the batts pass on their way to the pleats; an inclined continuous support for the batts extending from the delivery end of said conveyor to the rear ends of said chutes; and a positively rotated toothed disk located near the rear end of each chute and projecting into the chute and adapted to compress and aid in feeding the batts through the chute, whereby the advance ends of the batts may be automatically fed initially into the chutes.

34. Mechanism as specified in claim 33, in which said chutes are mounted on the lower margin of said inclined continuous support.

ALLISTER S. MITCHELL